United States Patent
Urakabe et al.

(10) Patent No.: US 7,348,739 B2
(45) Date of Patent: Mar. 25, 2008

(54) MOTOR DRIVING APPARATUS

(75) Inventors: Takahiro Urakabe, Tokyo (JP); Tatsuya Okuda, Tokyo (JP); Toshiyuki Kikunaga, Tokyo (JP); Yuuji Kuramoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/584,953

(22) PCT Filed: Feb. 2, 2005

(86) PCT No.: PCT/JP2005/001511

§ 371 (c)(1),
(2), (4) Date: Jul. 5, 2006

(87) PCT Pub. No.: WO2005/076460

PCT Pub. Date: Aug. 18, 2005

(65) Prior Publication Data

US 2007/0080659 A1    Apr. 12, 2007

(30) Foreign Application Priority Data

Feb. 6, 2004    (JP) .............................. 2004-031029

(51) Int. Cl.
*H02P 1/18*    (2006.01)
(52) U.S. Cl. ...................... 318/254; 318/138; 318/439; 318/700; 318/721; 363/40; 363/41; 363/132

(58) Field of Classification Search ................ 318/254, 318/139, 700, 701, 721; 363/40, 41, 132
See application file for complete search history.

(56) References Cited

U.S. PATENT DOCUMENTS

| 4,719,400 | A | * | 1/1988 | Kurakake et al. ........... 318/811 |
| 5,052,908 | A | * | 10/1991 | Inaba et al. ................. 425/150 |
| 5,373,223 | A | * | 12/1994 | Akagi et al. ................ 318/722 |
| 7,102,903 | B2 | * | 9/2006 | Nakamura et al. ............ 363/98 |
| 2006/0067655 | A1 | | 3/2006 | Okuda et al. | |

FOREIGN PATENT DOCUMENTS

| JP | 8 214592 | 8/1996 |
| JP | 2000 92851 | 3/2000 |
| JP | 2003 324942 | 11/2003 |

* cited by examiner

*Primary Examiner*—Rina Duda
(74) *Attorney, Agent, or Firm*—Oblon, Spivak, McClelland, Maier & Neustadt, P.C.

(57) ABSTRACT

A motor driving apparatus makes a carrier signal of an inverter be synchronized with a carrier signal of a DC/DC converter, and determines a phase difference between both the carrier signals based on a ratio of an input voltage inputted to the DC/DC converter and an input voltage inputted to the inverter, and a percentage of modulation and a power factor which are operation parameters of the inverter. When the frequency of the carrier signal of the DC/DC converter is set to be twice as high as that of the carrier signal of the inverter, an optimal phase difference is determined based on the ratio of the input voltage of the DC/DC converter and the input voltage of the inverter.

23 Claims, 25 Drawing Sheets

FIG.9
Voltage Raising Ratio = 1.4
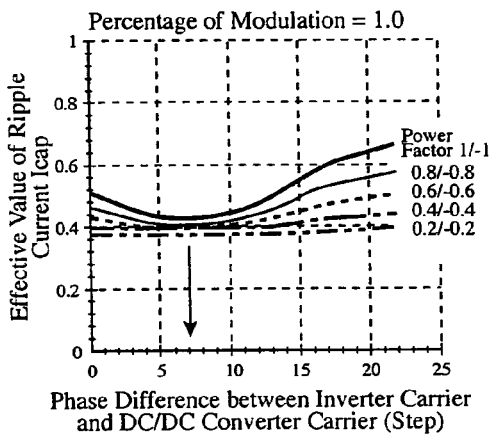
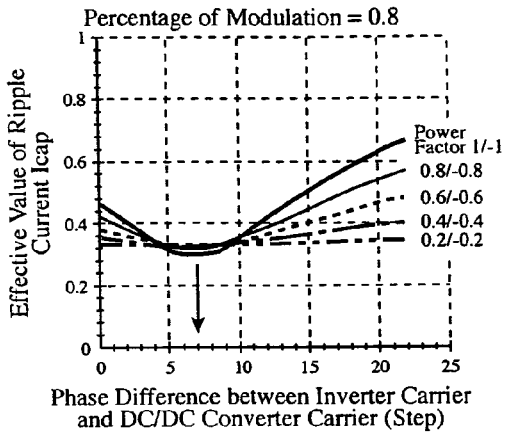
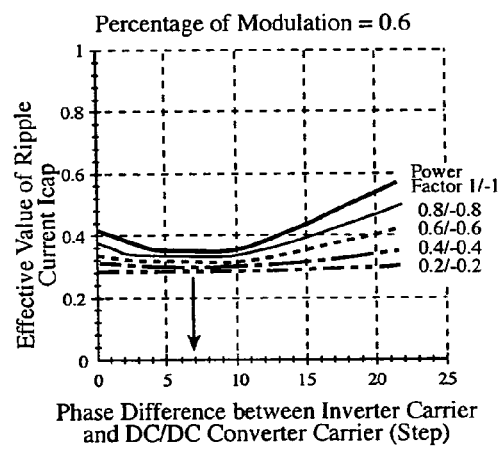
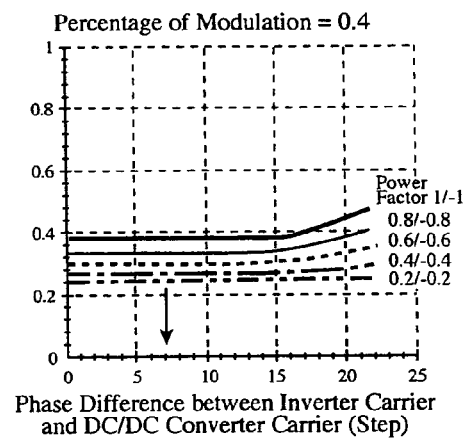
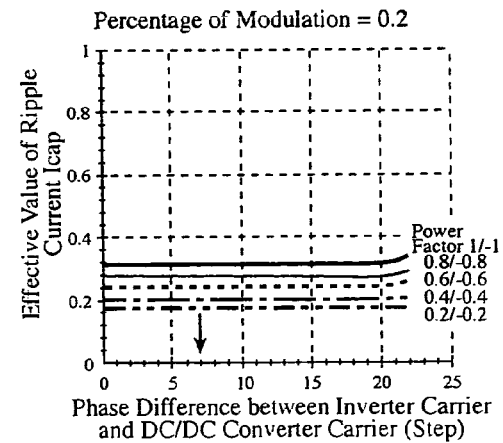

FIG.10
Voltage Raising Ratio = 1.6
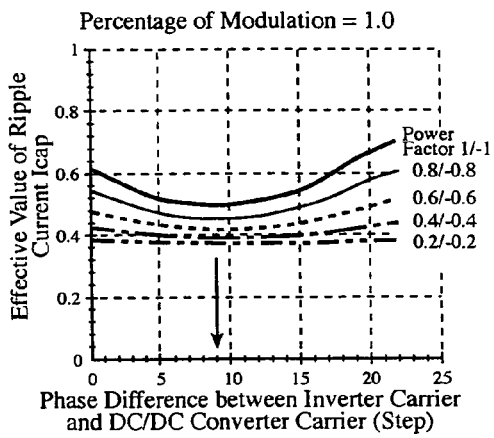
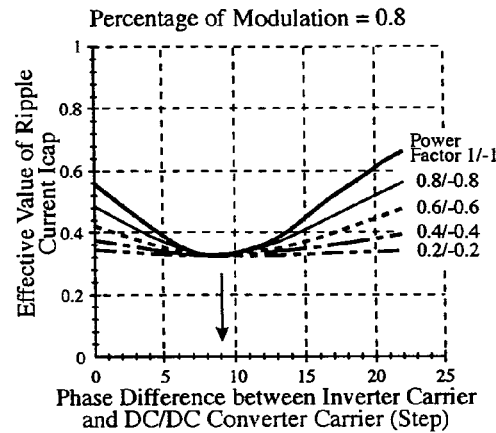
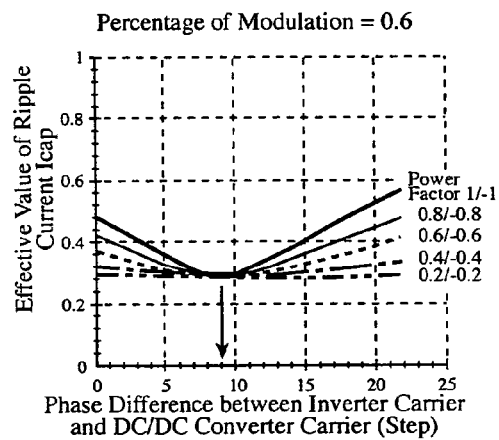
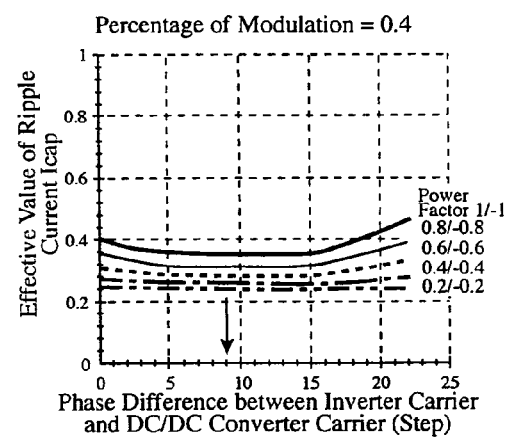
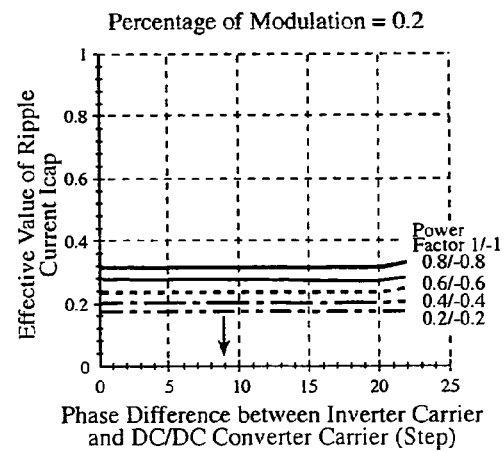

FIG.11
Voltage Raising Ratio = 1.8
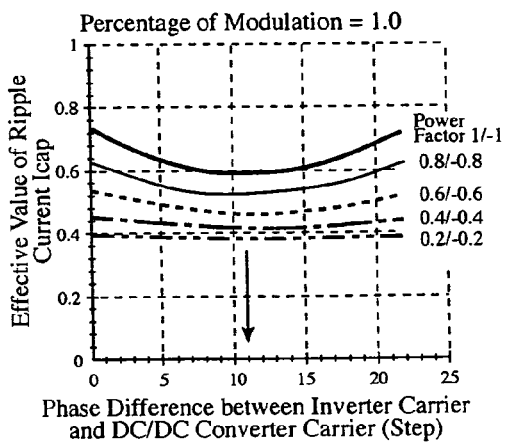
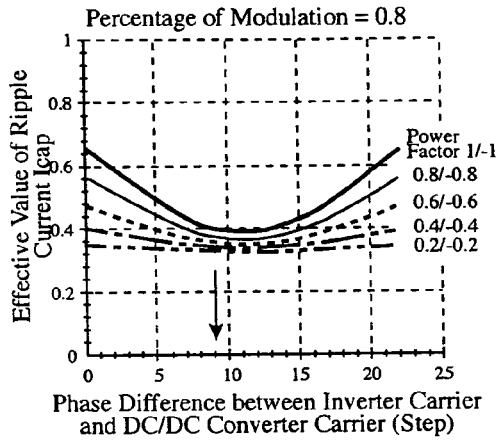
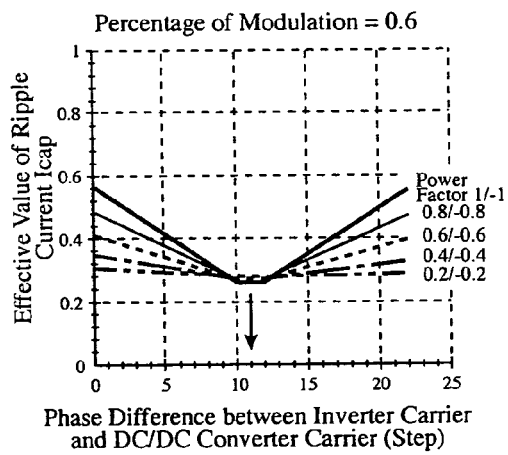
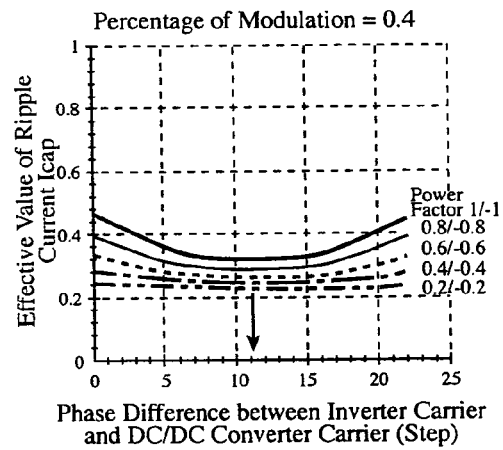
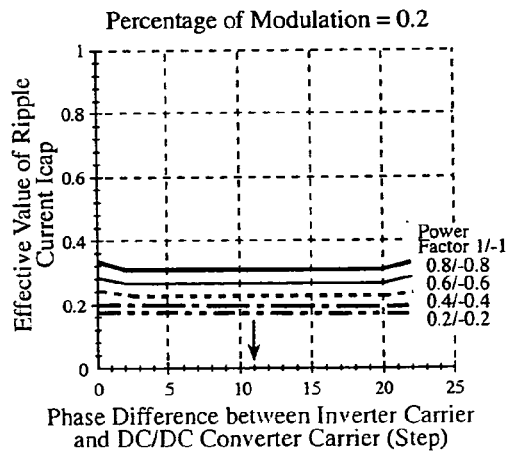

FIG.14
Voltage Raising Ratio = 1.6
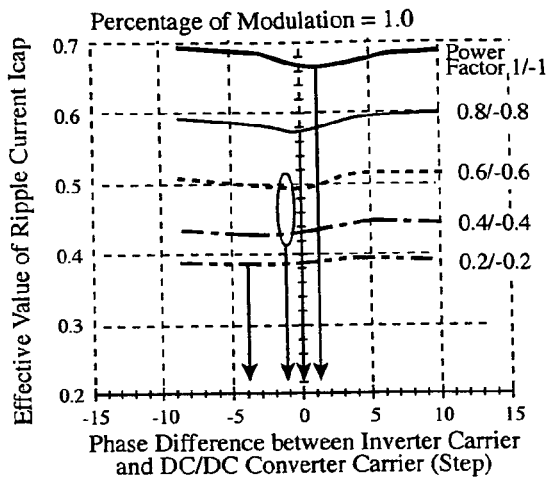
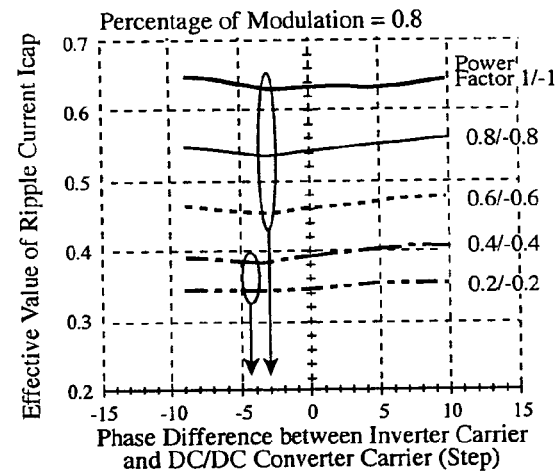
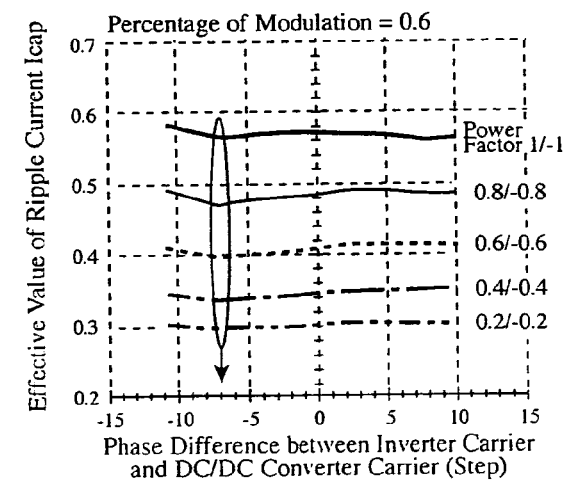

US 7,348,739 B2

MOTOR DRIVING APPARATUS

FIELD OF THE INVENTION

The present invention relates to a motor driving apparatus and a power converting apparatus.

BACKGROUND OF THE INVENTION

As an example of prior art motor driving apparatus used for an electric vehicle or HEV (Hybrid Electric Vehicle), there is a motor driving apparatus disclosed by patent reference 1. This motor driving apparatus is provided with a motor, an inverter for converting direct current power into AC power, a high-voltage battery, a DC/DC converter, and a DC link capacitor. The DC/DC converter raises a voltage furnished from the high-voltage battery and furnishes direct current power to the inverter at the time of power running, and lowers the direct current power outputted from the inverter and furnishes it to the high-voltage battery at the time of regeneration. The DC link capacitor is comprised of a plurality of capacitors and is arranged between the DC/DC converter and the inverter so as to smooth the direct current voltage.

Patent reference 1: JP,8-214592,A

When the prior art motor driving apparatus is so constructed that the inverter, DC/DC converter, and DC link capacitor are modularized into one power converter in order to downsize the motor driving apparatus, a current pulse outputted from the DC/DC converter to the DC link capacitor and an alternating current pulse furnished from the DC link capacitor to the inverter influence each other, and therefore a ripple current which flows into the DC link capacitor increases. When the related art motor driving apparatus is so constructed that an amount of ripple current which flows into each capacitor is equal to or less than an allowed value in order to secure the life of the DC link capacitor, there is a problem that the DC link capacitor increases in size and hence the whole apparatus increases in size.

The present invention is made in order to solve the above-mentioned problems, and it is therefore an object of the present invention to provide a motor driving apparatus and a power converting apparatus which minimize a ripple current which flows into a DC link capacitor thereof, and which decrease in size.

DISCLOSURE OF THE INVENTION

In accordance with the present invention, there is provided a motor driving apparatus including a power supply source, a DC/DC converter, an inverter, and a DC link capacitor, the DC link capacitor being connected between the inverter and the DC/DC converter and smoothing a voltage applied thereto, in which the motor driving apparatus makes the frequency of an inverter carrier signal for driving the inverter be synchronized with that of a DC/DC converter carrier signal for driving the DC/DC converter, and controls a phase difference between both the carrier signals based on either a ratio of an input voltage inputted to the DC/DC converter or an input voltage inputted to the inverter.

Thus, the motor driving apparatus makes the frequency of the inverter carrier signal be synchronized with that of the DC/DC converter carrier signal, and determines the phase difference between both the carrier signals based on either the ratio of the input voltage inputted to the DC/DC converter and the input voltage inputted to the inverter, or the ratio of the above-mentioned input voltages and a percentage of modulation and a power factor which are driving parameters of the inverter. Therefore, the ripple current which flows into the DC link capacitor can be reduced to a minimum, and the motor driving apparatus can be downsized.

BRIEF DESCRIPTION OF THE FIGURES

FIG. 9 is a diagram showing a relationship between the phase difference between the carrier signal of the DC/DC converter and the carrier signal of the inverter, and the ripple current value which flows into the DC link capacitor under various conditions in the motor driving apparatus in accordance with embodiment 1 of the present invention;

FIG. 10 is a diagram showing a relationship between the phase difference between the carrier signal of the DC/DC converter and the carrier signal of the inverter, and the ripple current value which flows into the DC link capacitor under various conditions in the motor driving apparatus in accordance with embodiment 1 of the present invention;

FIG. 11 is a diagram showing a relationship between the phase difference between the carrier signal of the DC/DC converter and the carrier signal of the inverter, and the ripple current value which flows into the DC link capacitor under various conditions in the motor driving apparatus in accordance with embodiment 1 of the present invention;

FIG. 14 is a diagram showing a relationship between a phase difference between a carrier signal of a DC/DC converter and a carrier signal of an inverter, and a ripple current value which flows into a DC link capacitor under various conditions in a motor driving apparatus in accordance with embodiment 2 of the present invention;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
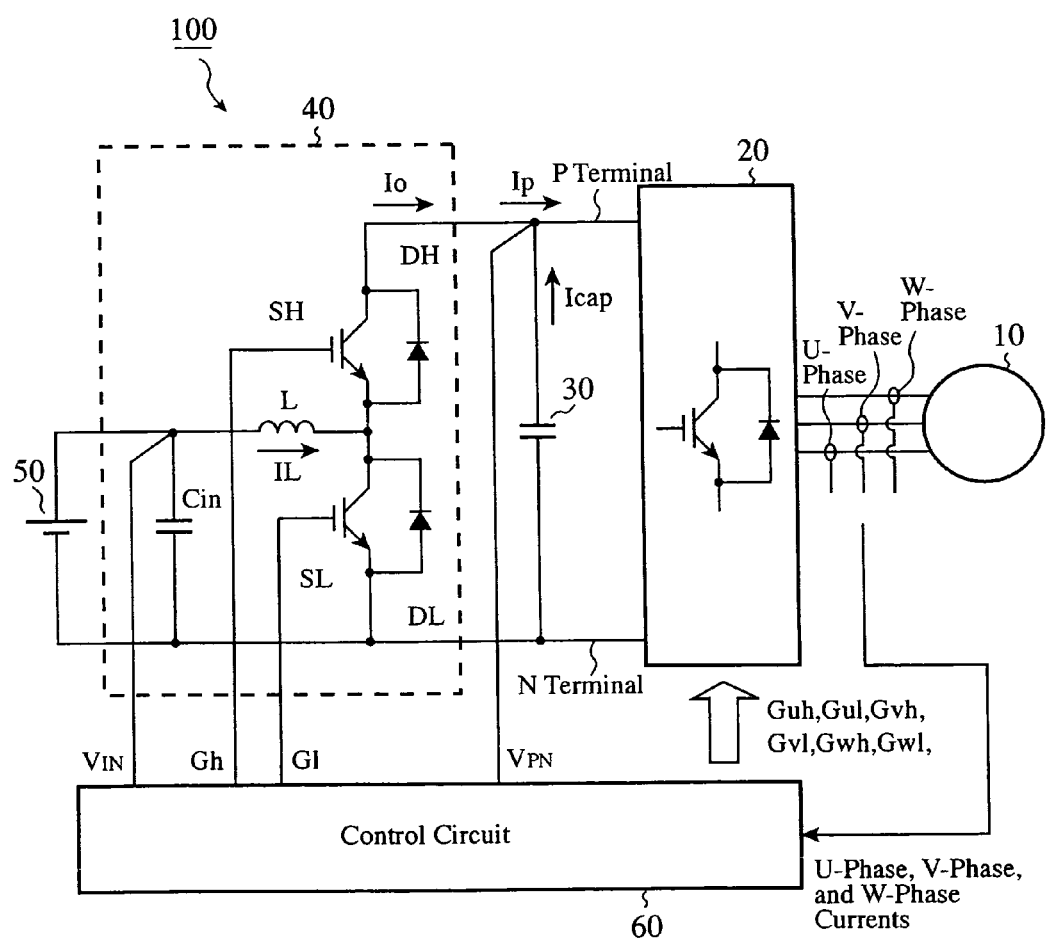
FIG. 1 is a diagram showing the structure of a motor driving apparatus in accordance with embodiment 1 of the present invention.

FIG. 1 is a diagram showing the structure of a motor driving apparatus 100 in accordance with embodiment 1 of the present invention. The motor driving apparatus 100 is used for an electric vehicle or HEV. As shown in the figure, the motor driving apparatus 100 is provided with a motor 10 for vehicle drive, an inverter 20, a DC link capacitor 30, a DC/DC converter 40, a high-voltage battery (i.e., a power supply source) 50 of 100V to 300V, and a control circuit 60.

The DC/DC converter 40 is provided with semiconductor switches (e.g., IGBTs: Insulated Gate Bipolar Transistors) SH and SL, diodes DH and DL, a choke coil L, and an input voltage smoothing capacitor Cin.

The collector terminals of the semiconductor switches SH and SL are connected to the cathode terminals of the diodes DH and DL, respectively, and the emitter terminals of the semiconductor switches SH and SL are connected to the anode terminals of the diodes DH and DL, respectively.

The collector terminal of the switch SH is connected to one terminal of the DC link capacitor 30 and a P terminal of the inverter 20, and the emitter terminal of the semiconductor switch SH is connected to the collector terminal of the switch SL and one terminal of the choke coil L.

The other terminal of the choke coil L is connected to one terminal of the input voltage smoothing capacitor Cin and the positive terminal of the high-voltage battery 50. The negative terminal of the high-voltage battery 50 is connected to the other terminal of the input voltage smoothing capacitor Cin, the emitter terminal of the switch SL, the other terminal of the DC link capacitor 30, and an N terminal of the inverter 20.

A U-phase terminal, a V-phase terminal, and a W-phase terminal which are output terminals of the inverter 20 are connected to a U-phase motor terminal, a V-phase motor terminal, and a W-phase motor terminal which are contact terminals of the motor for vehicle drive 10, respectively.

Figure 2:
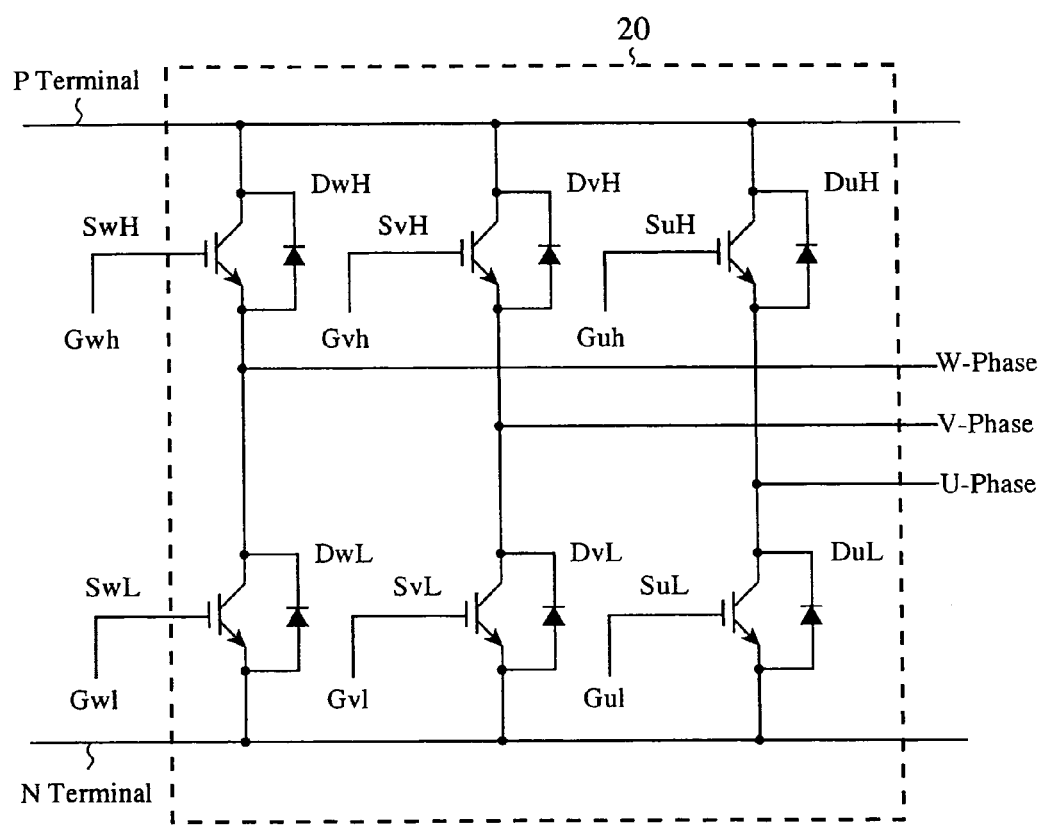
FIG. 2 is a diagram showing the structure of an inverter in accordance with embodiment 1 of the present invention.

FIG. 2 is a diagram showing the structure of the inverter 20. As shown in the figure, the inverter 20 is provided with semiconductor switches (e.g., IGBTs) SuH, SvH, SwH, SuL, SvL, and SwL, and diodes DuH, DvH, DwH, DuL, DvL, and DwL.

The collector terminals of the semiconductor switches SuH, SvH, SwH, SuL, SvL, and SwL are connected to the cathode terminals of the diodes DuH, DvH, DwH, DuL, DvL, and DwL, respectively, and the emitter terminals of the semiconductor switches SuH, SvH, SwH, SuL, SvL, and SwL are connected to the anode terminals of the diodes DuH, DvH, DwH, DuL, DvL, and DwL, respectively.

The collector terminal of the switch SuH is connected to the P terminal, the emitter terminal of the switch SuH is connected to the collector terminal of the switch SuL and the U-phase terminal, and the emitter terminal of the switch SuL is connected to the N terminal, so that a U-phase arm is constructed.

Similarly, the collector terminal of the switch SvH is connected to the P terminal, the emitter terminal of the switch SvH is connected to the collector terminal of the switch SvL and the V-phase terminal, and the emitter terminal of the switch SvL is connected to the N terminal, so that a V-phase arm is constructed.

Furthermore, the collector terminal of the switch SwH is connected to the P terminal, the emitter terminal of the switch SwH is connected to the collector terminal of the switch SwL and the W-phase terminal, and the emitter terminal of the switch SwL is connected to the N terminal, so that a W-phase arm is constructed.

Next, the operation of the motor driving apparatus in accordance with this embodiment of the present invention will be explained.

Signals Guh, Gul, Gvh, Gvl, Gwh, and Gwl which are outputted from the control circuit 60 are outputted in a state where they are converted into signals each having a voltage commensurate with its input voltage level, and those signals are furnished to the gates of the semiconductor switches SuH, SuL, SvH, SvL, SwH, and SwL of the inverter 20, respectively.

Signals Gh and Gl are also outputted from the control circuit 60 in a state where they are similarly converted into signals each having a voltage commensurate with its input voltage level, and are furnished to the gates of the switches SH and SL of the DC/DC converter 40, respectively.

The signals Guh, Gul, Gvh, Gvl, Gwh, and Gwl control the semiconductor switches SuH, SuL, SvH, SvL, SwH, and SwL, respectively, and the inverter 20 converts a direct current voltage furnished thereto via the DC/DC converter 40 from the high-voltage battery 50 into an alternating voltage and furnishes it to the motor for vehicle drive 10 according to the controlling by the signals.

When a voltage generated by the motor for vehicle drive 10 becomes higher than the voltage furnished by the high-voltage battery 50, the inverter 20 converts the alternating voltage from the motor for vehicle drive 10 into a direct current voltage under the control of the control circuit 60, and furnishes the direct current voltage to the high-voltage battery 50.

A voltage across the DC link capacitor 30, a voltage across the input voltage smoothing capacitor Cin (=the voltage of the high-voltage battery 50), and U-phase, V-phase, and W-phase current values of the inverter 20 are furnished to the control circuit 60, and are used for controlling the inverter 20 and DC/DC converter 40.

Next, an operation of the inverter 20 will be explained.

Figure 3:
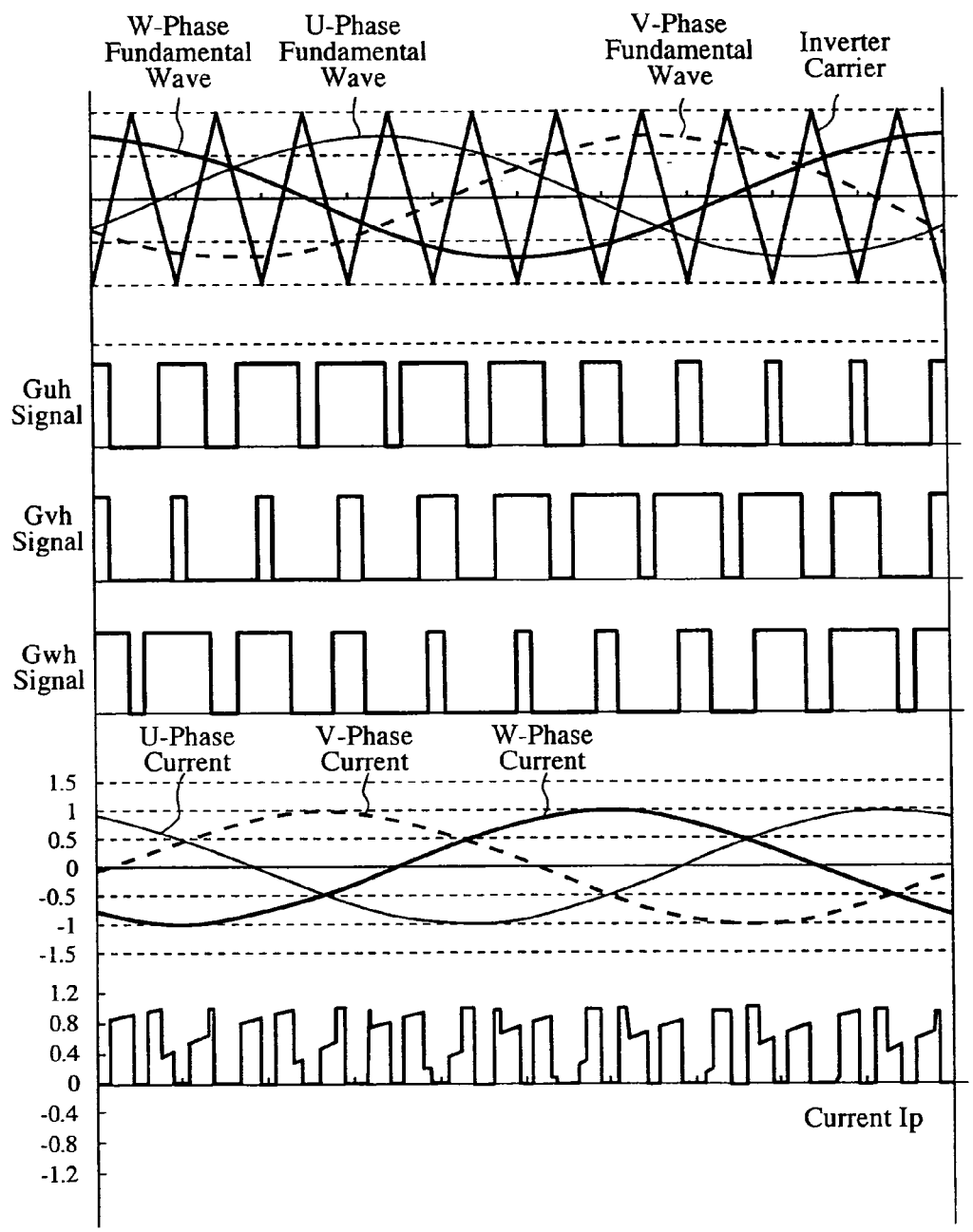
FIG. 3 is a diagram for explaining an operation of the inverter.

FIG. 3 is a diagram for explaining the operation of the inverter 20. In the figure, the waveform of a carrier signal of the inverter 20, the waveforms of U-phase, V-phase, and W-phase fundamental wave signals (i.e., indicated voltage values), the signals Guh, Gvh, and Gwh which are generated based on a comparison between the carrier signal and the fundamental wave signals, U-phase, V-phase, and W-phase motor currents, and an input current Ip inputted to the inverter 20 are shown.

The signal Gul is the reverse of the signal Guh, the signal Gvl is the reverse of the Gvh, and the signal Gwl is the reverse of the signal Gwh.

The input of the signals Guh, Gvh, Gwh, Gul, Gvl, and Gwl to the gates of the semiconductor switches SuH, SvH, SwH, SuL, SvL, and SwL, respectively, causes alternating voltages respectively having the same amplitudes as the U-phase, V-phase, and W-phase fundamental wave signals and depending on an input voltage inputted to the inverter 20 (i.e., a voltage across between the P and N terminals) to occur at the phase terminals, respectively.

By changing the amplitude of each phase fundamental wave signal, the amplitude of the voltage which appears at each phase terminal can be changed. Furthermore, by changing the phase of each phase current and that of each phase fundamental wave signal, the voltage which appears at each phase terminal and the phase of each phase current can be changed.

The ratio of the amplitude of each fundamental wave signal to the zero-peak value of the carrier signal of the inverter 20 (i.e., fundamental wave amplitude/inverter carrier zero-peak value) is called the percentage of modulation. When the phase of a phase current and that of a corresponding fundamental wave signal are $\phi$, $\cos \phi$ is called the power factor.

Next, an operation of the DC/DC converter 40 will be explained.

Figure 4:
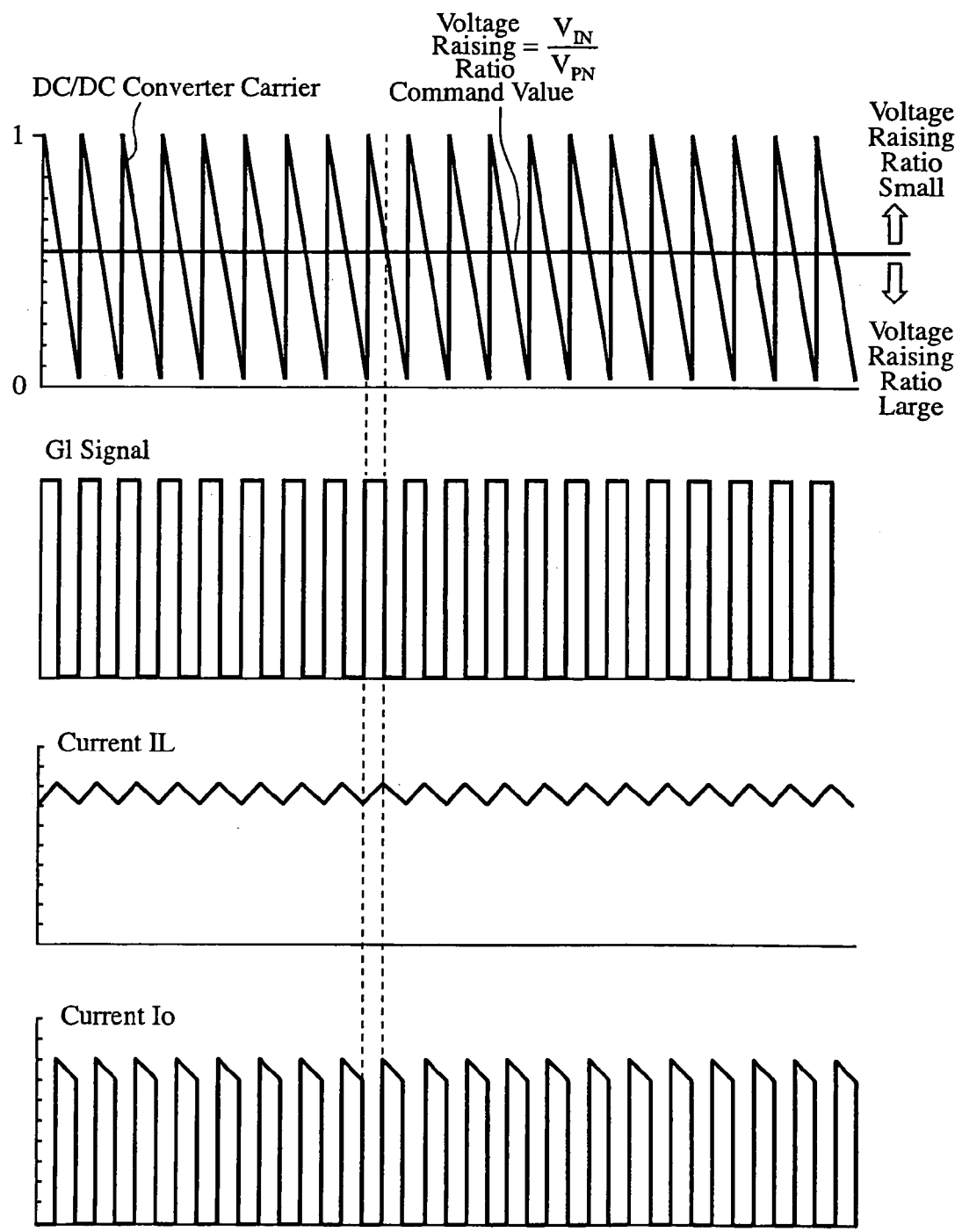
FIG. 4 is a diagram for explaining a voltage raising operation of a DC/DC converter.

FIG. 4 is a diagram for explaining a voltage raising operation of the DC/DC converter 40. In the voltage raising operation, the flow of power is directed from the high-voltage battery 50 toward the inverter 20. In the figure, the carrier signal of the DC/DC converter 40, a voltage raising ratio command value, the gate signal Gl of the switch SL which is generated by a comparison between the carrier signal of the DC/DC converter and the voltage raising ratio command value, a current IL which flows into the choke coil L, and an output current Io of the DC/DC converter 40 are shown.

Here, the voltage raising ratio command value is expressed by $V_{PN}/V_{IN}$, where an input voltage inputted to the DC/DC converter 40 is $V_{IN}$, and an output voltage of the DC/DC converter 40 (=the voltage across the DC link capacitor 30= the input voltage of the inverter 20) is $V_{PN}$.

The choke coil current IL is a direct current on which a ripple is superimposed. The amplitude of the ripple of the choke coil current IL varies dependently upon the inductance of the choke coil L, and the larger inductance the choke coil has the smaller amplitude the ripple has. The output current Io is a pulse-shaped current. The voltage raising operation can be controlled by controlling the gate signal Gl of the switch SL as shown in the figure.

Figure 5:
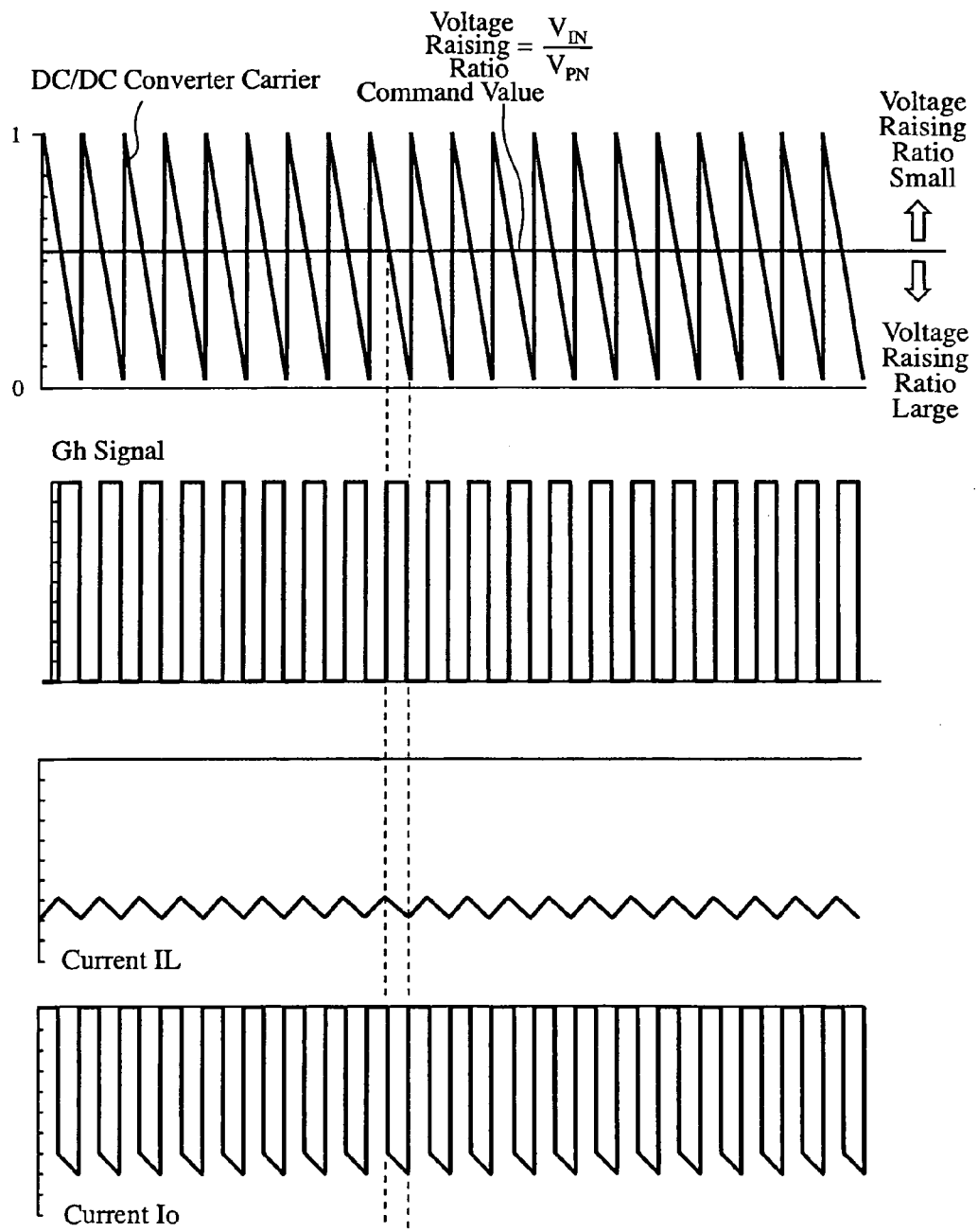
FIG. 5 is a diagram for explaining a voltage lowering operation of the DC/DC converter.

Next, a voltage lowering operation of the DC/DC converter 40 will be explained with reference to FIG. 5. In the voltage lowering operation, the flow of power is directed from the inverter 20 toward the high-voltage battery 50.

In the figure, the carrier signal of the DC/DC converter 40, the voltage raising ratio command value, the gate signal Gh of the switch SH which is generated by a comparison between the carrier signal of the DC/DC converter and the voltage raising ratio command value, the current IL which flows into the choke coil L, and the output current Io of the DC/DC converter 40 are shown.

As in the case of the voltage raising operation, the choke coil current IL is a direct current on which a ripple is superimposed, and the output current Io is a pulse-shaped current. The voltage lowering operation can be controlled by controlling the gate signal Gh of the switch SH, as shown in the figure.

Next, an operation (minimization operation) of reducing the ripple current which flows into the DC link capacitor 30 of the motor driving apparatus in accordance with embodiment 1 of the present invention will be explained.

Figure 6:
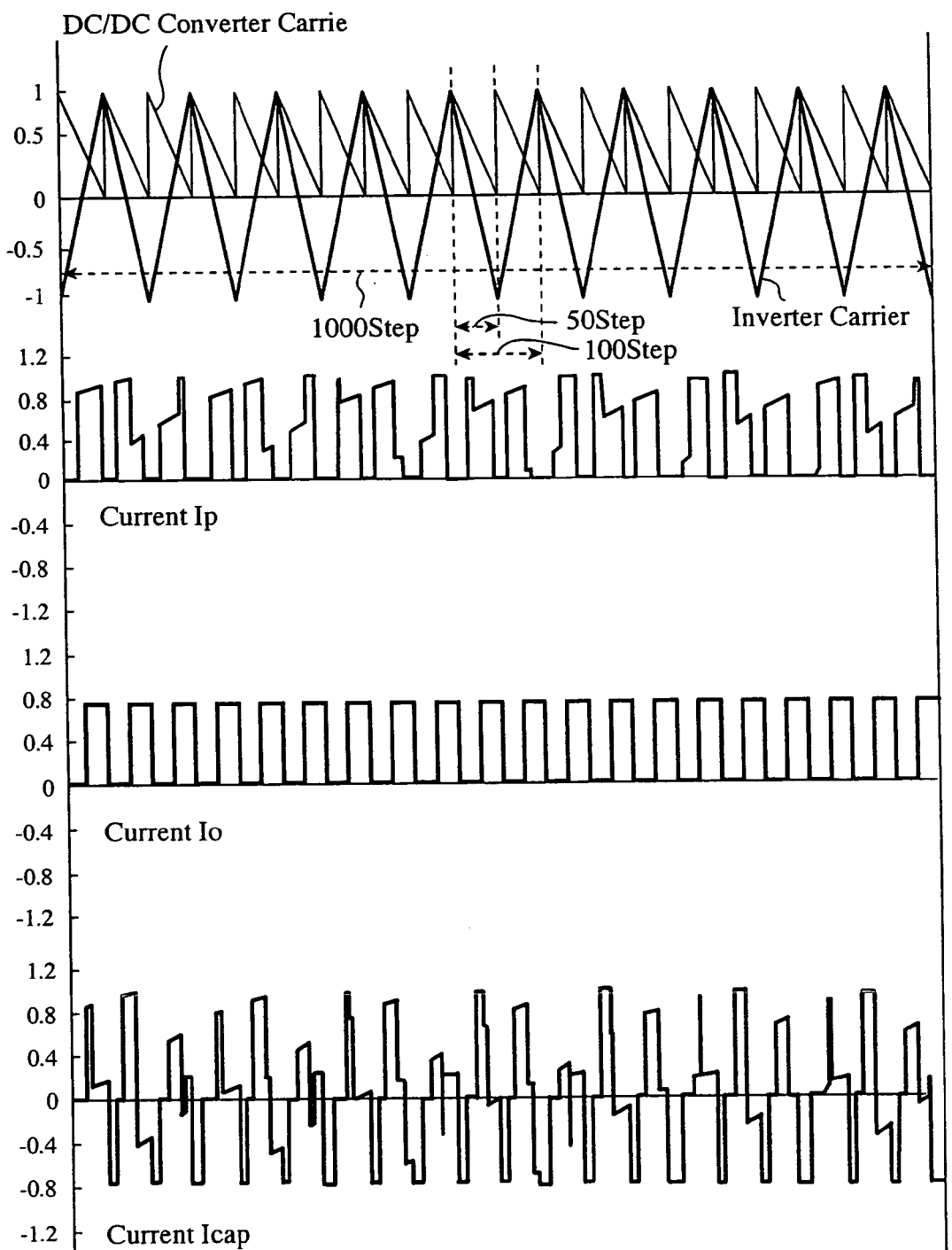
FIG. 6 is a diagram for explaining a ripple current which flows into a DC link capacitor.

FIG. 6 is a diagram for explaining the ripple current which flows into the DC link capacitor 30. In the figure, the carrier signal of the DC/DC converter 40, the carrier signal of the inverter 20, the input current Ip inputted to the inverter 20, the output current Io of the DC/DC converter 40, and the current Icap which flows through the DC link capacitor 30 are shown.

In this case, the period of the carrier signal of the inverter 20 is set to 100 steps and the period of the carrier signal of the DC/DC converter 40 is set to 50 steps. 1000 steps from step 0 to step 999 are shown in the figure. In this case, the percentage of modulation is 0.7, the power factor is 0.8, and the voltage raising ratio is 1.8. Here, the voltage raising ratio is $V_{PN}/V_{IN}$.

In accordance with embodiment 1, the carrier signal of the DC/DC converter 40 is synchronized with the carrier signal of the inverter 20, and the frequency of the carrier signal of the DC/DC converter 40 is set so as to be twice as high as that of the carrier signal of the inverter 20.

As shown in the figure, a case where the time when the carrier signal of the inverter 20 has a peak value coincides with the time when the carrier signal of the DC/DC converter 40 has a peak value every two periods is defined as a case where the phase difference between the carrier signal of the DC/DC converter 40 and the carrier signal of the inverter 20 is 0.

The reason why the frequency of the carrier signal of the DC/DC converter 40 is set so as to be twice as high as that of the carrier signal of the inverter 20 is because the period of the input pulse-shaped current Ip inputted to the inverter 20 is one-half as high as that of the carrier signal of the inverter 20, as can be seen from the figure. Since the current Icap which flows into the DC link capacitor 30 can be obtained from the equation (1), it can be assumed that the current Icap can be reduced if the input current Ip inputted to the inverter 20 coincides with the output current Io of the DC/DC converter 40.

$$Icap=Ip-Io \qquad (1)$$

Figure 7:
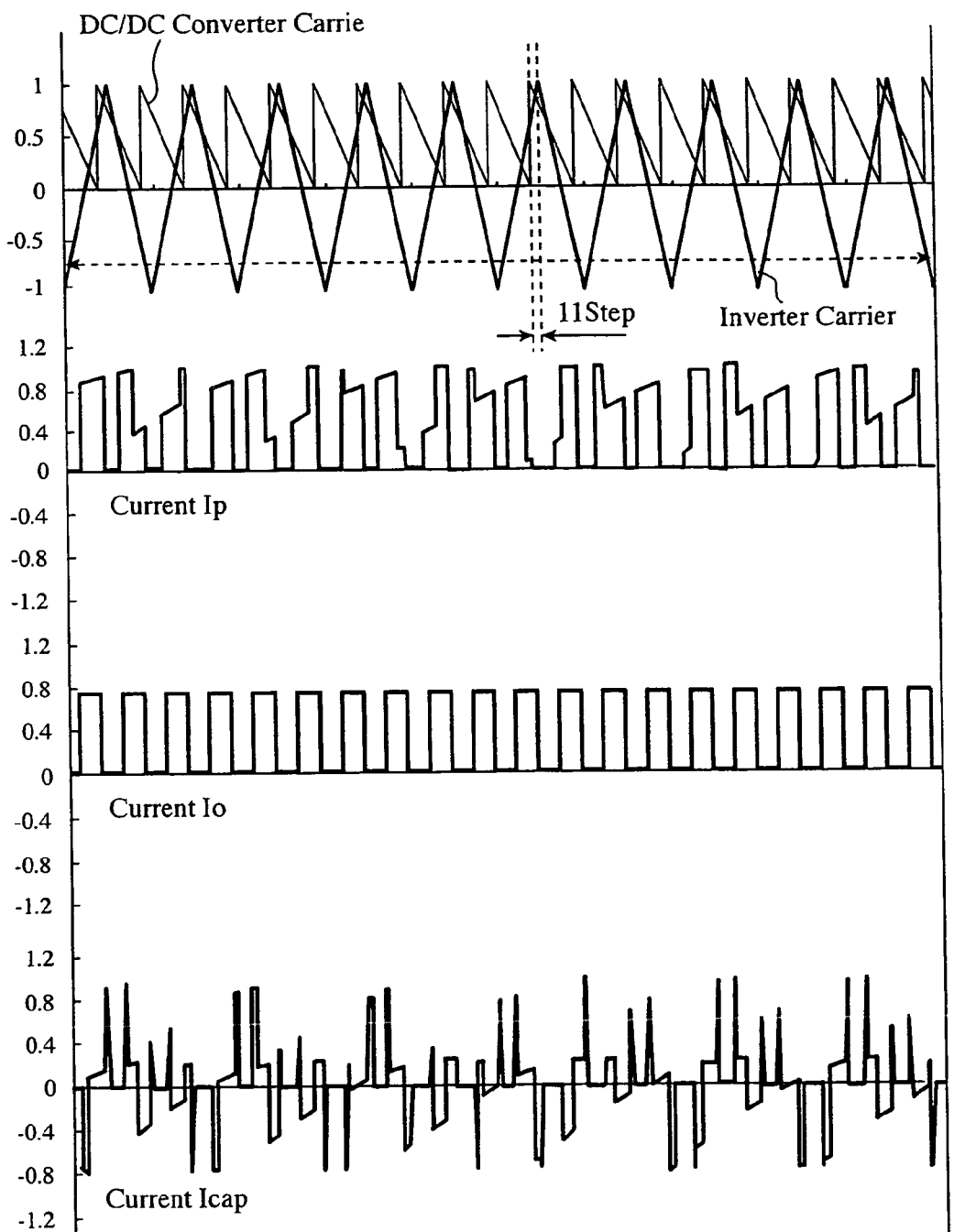
FIG. 7 is a diagram for explaining the ripple current which flows into the DC link capacitor at a time of changing a phase difference between a carrier signal of the DC/DC converter, and a carrier signal of the inverter.

FIG. 7 shows a case where the phase difference between the carrier signal of the DC/DC converter and the carrier signal of the inverter is set to 11 steps under the conditions shown in FIG. 6. As can be seen from a comparison between FIGS. 6 and 7, the current Icap which flows into the DC link capacitor 30 can be reduced on the same conditions as shown in FIG. 6 when the phase difference is set to 11 steps.

As mentioned above, when the period of the carrier signal of the DC/DC converter 40 is synchronized with that of the carrier signal of the inverter 20, the period of the carrier signal of the DC/DC converter is set so as to be one-half as high as that of the carrier signal of the inverter, and the phase difference between the carrier signal of the DC/DC converter and the carrier signal of the inverter is set appropriately, the ripple current which flows into the DC link capacitor 30 can be reduced.

A process of changing the phase difference between the carrier signal of the inverter 20 and the carrier signal of the DC/DC converter 40 is carried out by a microcomputer disposed in the control circuit 60. As an alternative, the microcomputer disposed in the control circuit 60 can be so constructed as to output a synchronizing signal which is synchronized with the carrier signal of the inverter 20 and a phase difference indicated value (an analog value or 8-bit digital value), and to cause a control circuit of the DC/DC converter 40, which is disposed in the control circuit 60, to operate according to those signals, so that the phase difference between the carrier signal of the inverter and the carrier signal of the DC/DC converter is adjusted to a target value.

Even if the carrier signal of the DC/DC converter 40, and the carrier signal of the inverter 20 are not adjusted in such a way as shown in FIG. 7, the ripple current which flows into the DC link capacitor 30 can be reduced sufficiently as long as the frequency of the carrier signal of the DC/DC converter 40 is set so as to be 10 or more times as high as that of the carrier signal of the inverter 20. However, when the carrier frequency of the DC/DC converter 40 is increased, the loss of the current increases and it is necessary to enlarge the whole apparatus in order to remove the heat generated due to the loss of the current.

FIGS. 8 to 12 show results of calculation of the effective value of the current Icap which flows into the DC link capacitor 30 at the time of changing the phase difference between the carrier signal of the DC/DC converter 40 and the carrier signal of the inverter 20 under various conditions that the voltage raising ratio ($V_{PN}/V_{IN}$), the percentage of modulation of inverter 20, and the power factor are varied widely.

In the calculation, the frequency of the carrier signal of the DC/DC converter 40 is set so as to be twice as high as that of the inverter carrier signal frequency, and they are synchronized with each other.

Figure 8:
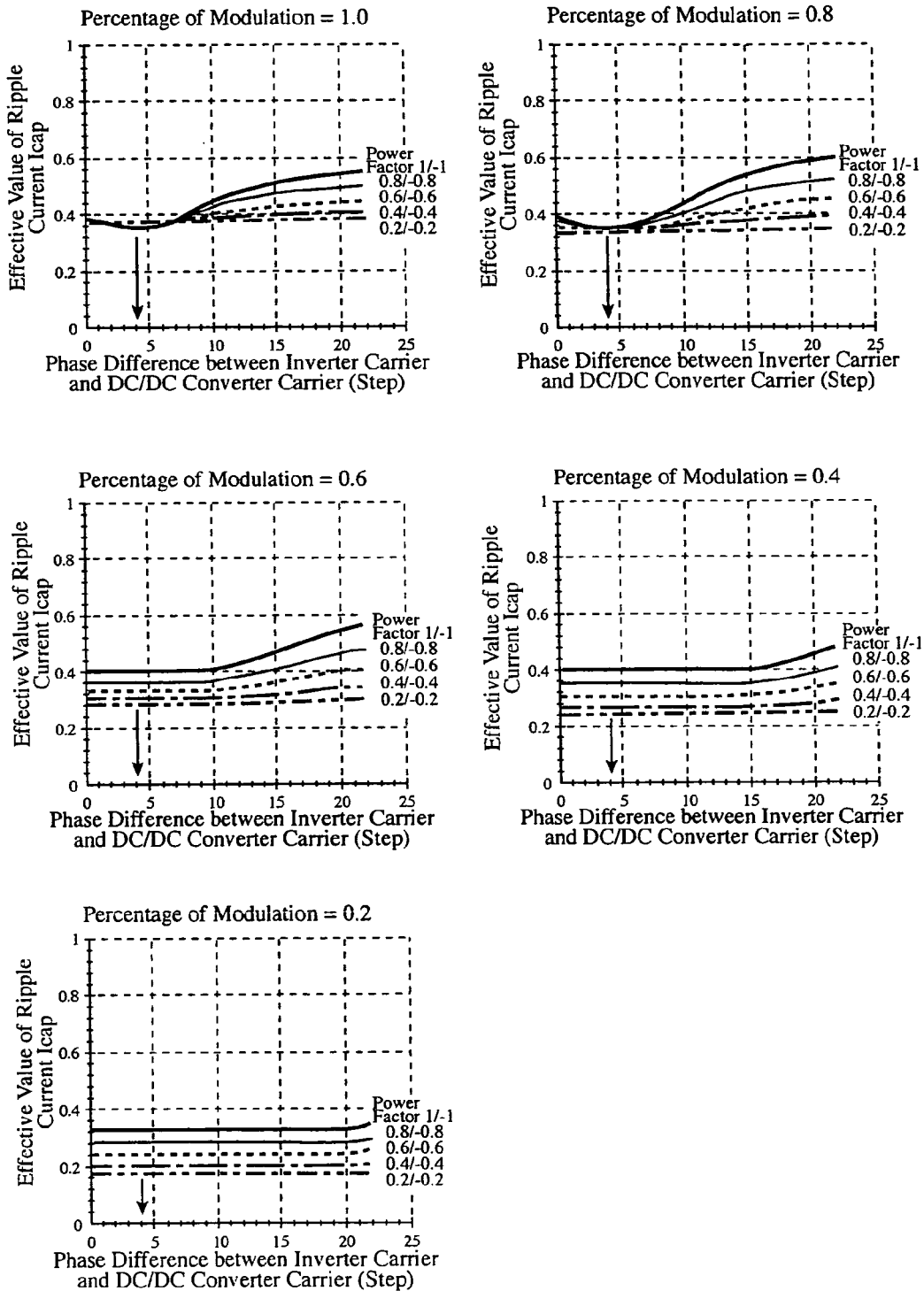
FIG. 8 is a diagram showing a relationship between the phase difference between the carrier signal of the DC/DC converter and the carrier signal of the inverter, and the ripple current value which flows into the DC link capacitor under various conditions in the motor driving apparatus in accordance with embodiment 1 of the present invention.
Figure 12:
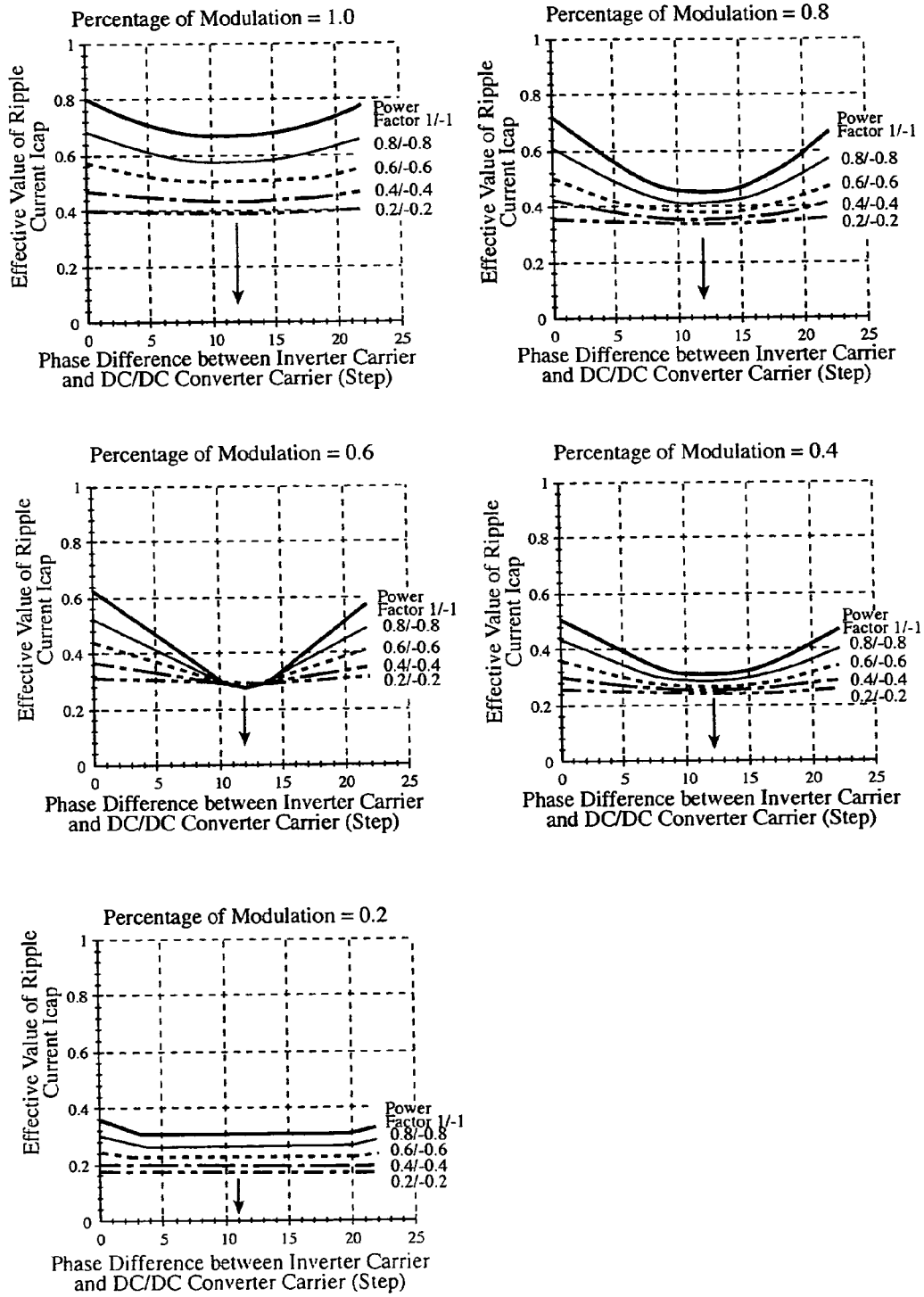
FIG. 12 is a diagram showing a relationship between the phase difference between the carrier signal of the DC/DC converter and the carrier signal of the inverter, and the ripple current value which flows into the DC link capacitor under various conditions in the motor driving apparatus in accordance with embodiment 1 of the present invention.

FIG. 8 shows calculation results in a case where the voltage raising ratio is 1.2, FIG. 9 shows calculation results in a case where the voltage raising ratio is 1.4, FIG. 10 shows calculation results in a case where the voltage raising ratio is 1.6, FIG. 11 calculation results in a case where the voltage raising ratio is 1.8, and FIG. 12 shows calculation results in a case where the voltage raising ratio is 2.0. In each of these figures, graphs showing calculation results in cases where the percentage of modulation is set to 1.0, 0.8, 0.6, 0.4, and 0.2, respectively, are illustrated. In each graph, calculation results for every power factor are shown. A positive power factor shows a case where the DC/DC converter 40 performs a voltage raising operation, whereas a negative power factor shows a case where the DC/DC converter 40 performs a voltage lowering operation.

The horizontal axis of each graph shows the phase difference between the carrier signal of the DC/DC converter 40 and the carrier signal of the inverter 20, and the vertical axis of each graph shows the current effective value (relative value) of the DC link capacitor 30.

FIG. 8 shows that an optimal phase difference which minimizes the current value corresponds to 4 steps regardless of the percentage of modulation and the power factor under the conditions that the voltage raising ratio is 1.2.

In addition, it is clear from FIGS. 8 to 12 that the optimal phase difference does not depend on the percentage of modulation and the power factor, but depends only on the voltage raising ratio.

To be more specific, it is clear from FIG. 9 that the optimal phase difference under the conditions that the voltage raising ratio is 1.4 corresponds to 7 steps, it is clear from FIG. 10 that the optimal phase difference under the conditions that the voltage raising ratio is 1.6 corresponds to 9 steps, it is clear from FIG. 11 that the optimal phase difference under the conditions that the voltage raising ratio is 1.8 corresponds to 11 steps, and it is clear that the optimal phase difference under the conditions that the voltage raising ratio is 2 corresponds to 12 steps.

Figure 13:
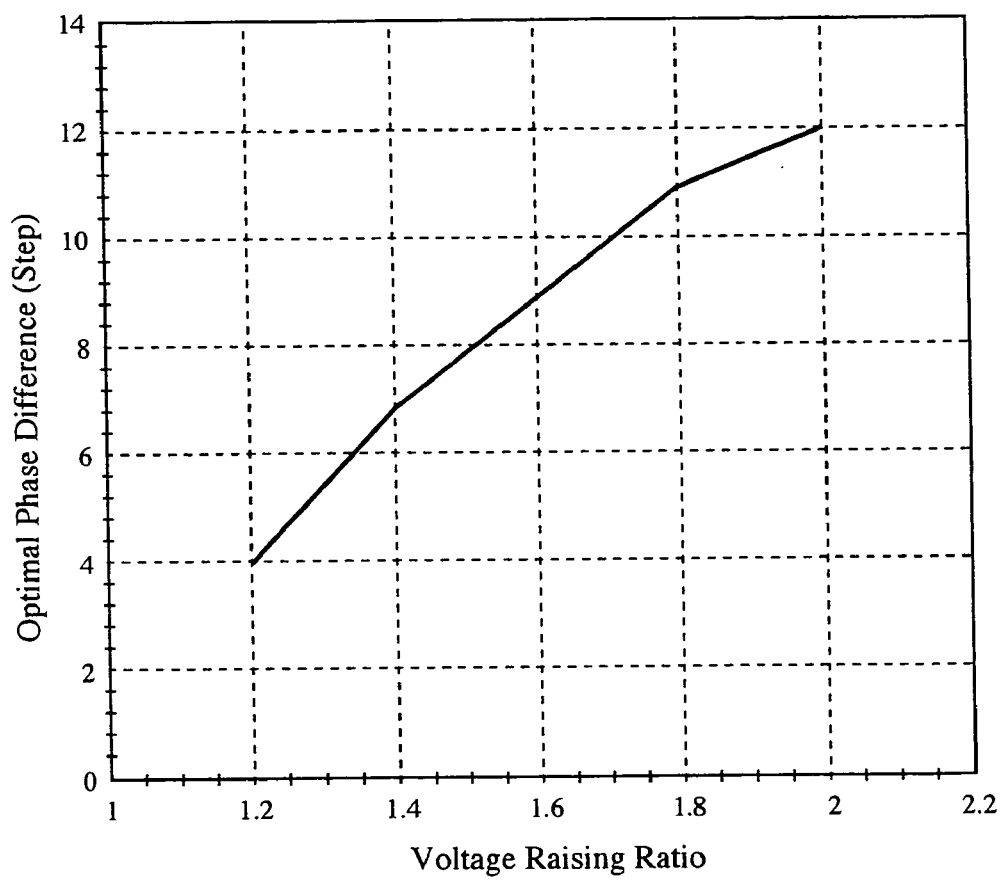
FIG. 13 is a diagram showing an optimal phase difference between the carrier signal of the DC/DC converter and the carrier signal of the inverter which depends on a voltage raising ratio.

FIG. 13 shows the optimal phase difference between the carrier signal of the DC/DC converter 40 and the carrier signal of the inverter 20 which depends on the voltage raising ratio.

As mentioned above, according to embodiment 1, when the period of the carrier signal of the DC/DC converter 40 is synchronized with that of the carrier signal of the inverter 20, and the frequency of the carrier signal of the DC/DC converter 40 is set so as to be twice as high as that of the carrier signal of the inverter 20, the current Icap which flows into the DC link capacitor 30 can be minimized by setting the phase difference between the carrier signal of the DC/DC converter 40 and the carrier signal of the inverter 20 to an optimal value determined by the voltage raising ratio, and the DC link capacitor 30 can be therefore downsized.

Embodiment 2

In accordance with embodiment 1, the period of the carrier signal of the DC/DC converter 40 is synchronized with that of the carrier signal of the inverter 20, and the frequency of the carrier signal of the DC/DC converter 40 is set so as to be twice as high as that of the carrier signal of the inverter 20. In contrast, in accordance with embodiment 2, the frequency of the carrier signal of the DC/DC converter 40 is set so as not to be twice as high as that of the carrier signal of the inverter 20, and the phase difference between the carrier signals is optimized.

FIG. 14 shows a relationship between the phase difference between the carrier signal of the DC/DC converter 40 and the carrier signal of the inverter 20, and a result of calculation of the ripple current Icap which flows into the DC link capacitor 30 under various conditions in a case where the period of the carrier signal of the DC/DC converter 40 is synchronized with that of the carrier signal of the inverter 20, and the frequency of the carrier signal of the DC/DC converter 40 is set so as to be three times as high as that of the carrier signal of the inverter 20.

FIG. 14 shows graphs in cases which the voltage raising ratio is set to 1.6, and the percentage of modulation is set to 1.0, 0.8, and 0.6, respectively. As can be seen from the figure, in accordance with embodiment 2, the optimal phase difference between the carrier signal of the DC/DC converter 40 and the carrier signal of the inverter 20, which minimizes the current Icap which flows into the DC link capacitor 30, differs dependently upon the percentage of modulation and the power factor even though the voltage raising ratio is held constant.

Although calculation results in a case of other voltage raising ratio values are not shown, similar calculation results are also obtained even in a case of other voltage raising ratio values.

Thus, according to embodiment 2 of the present invention, when the frequency of the carrier signal of the DC/DC converter 40 is set so as not to be twice as high as that of the carrier signal of the inverter 20, the phase difference between the carrier signals is set to an optimal value determined by a combination of the voltage raising ratio, the percentage of modulation, and the power factor. Therefore, this embodiment does not produce a larger effect than embodiment 1, but offers an advantage of being able to reduce the current Icap which flows into the DC link capacitor 30.

Embodiment 3

Figure 15:
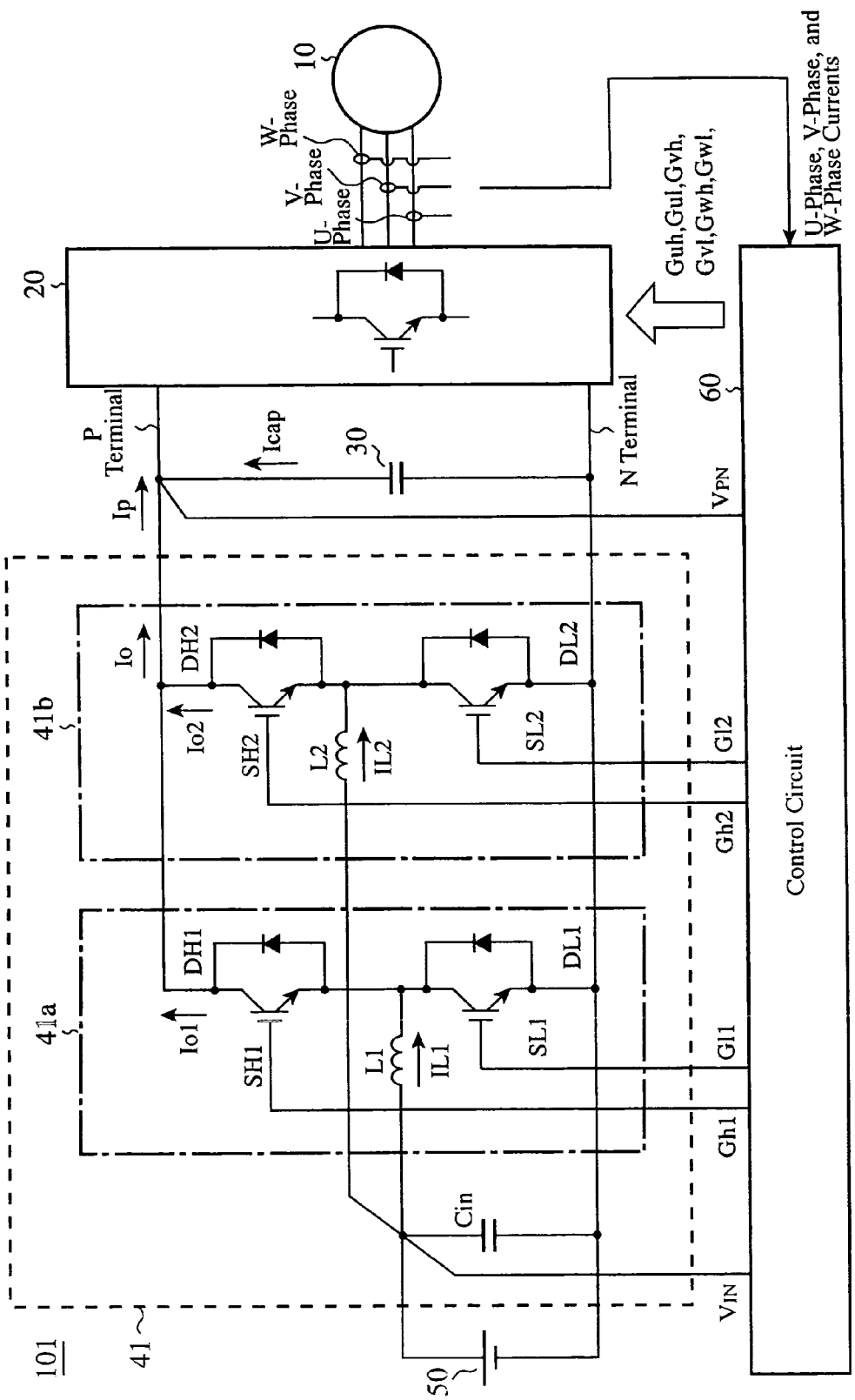
FIG. 15 is a diagram showing the structure of a motor driving apparatus in accordance with embodiment 3 of the present invention.

FIG. 15 is a diagram showing the structure of a motor driving apparatus 101 in accordance with embodiment 3 of the present invention. The same numerals as shown in FIG. 1 denote the same components as those shown in FIG. 1. The motor driving apparatus in accordance with this embodiment differs from that of embodiment 1 in that a DC/DC converter 41 is a multi-phase converter (in this case, a two-phase one). The DC/DC converter 41 is provided with a DC/DC converter 41a and a DC/DC converter 41b.

A multi-phase DC/DC converter is comprised of two or more DC/DC converters connected in parallel with each other, and operates in such a manner that the outputs of the two or more DC/DC converters are out of phase with one another. The merit of using the multi-phase DC/DC converter 41 is to reduce a ripple current which flows into an input voltage smoothing capacitor Cin and a ripple current which flows into a DC link capacitor 30. On the other hand, the demerit of using the multi-phase DC/DC converter is to make a control circuit 60 become complicated since it is necessary to control the two or more DC/DC converters of the multi-phase DC/DC converter. Therefore, the multi-phase DC/DC converter 41 is used when constituting a relatively large-scale DC/DC converter.

Next, the operation of the motor driving apparatus in accordance with this embodiment of the present invention will be explained.

First, an operation of the DC/DC converter 41 will be explained. Although there are various methods of controlling the two-phase DC/DC converter 41, the motor driving apparatus in accordance with embodiment 3 uses a method of making the carrier signal of the DC/DC converter 41a and the carrier signal of the DC/DC converter 41b be 180 degrees out of phase with each other.

Figure 16:
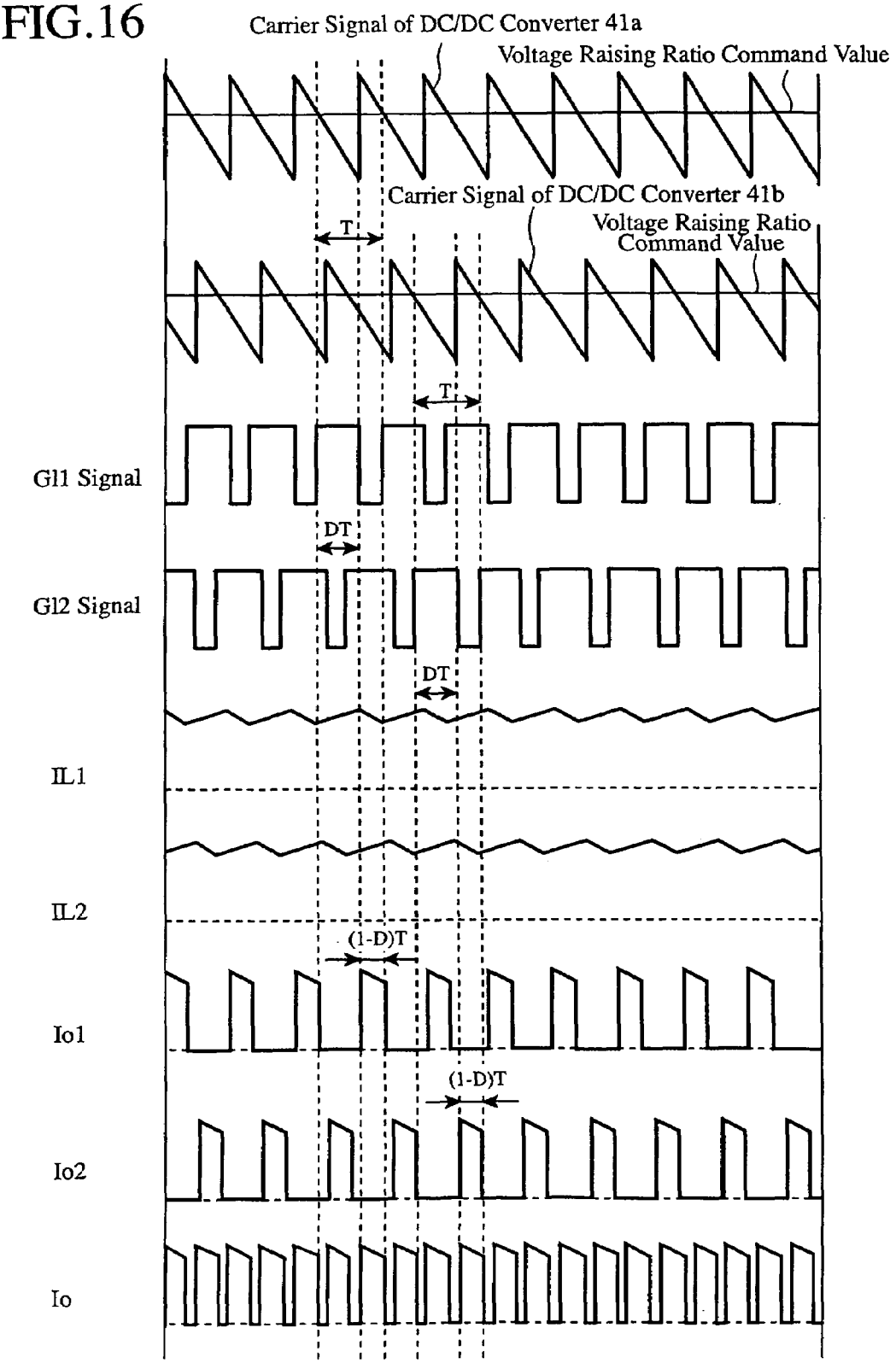
FIG. 16 is a diagram for explaining a voltage raising operation of a DC/DC converter.

FIG. 16 is a diagram for explaining a voltage raising operation of the DC/DC converter 41.

In the figure, the waveforms of the carrier signals of the DC/DC converters 41a and 41b, Gl1 and Gl2 signals for controlling semiconductor switches SL1 and SL2, respectively, currents IL1 and IL2 which flow into choke coils L1 and L2, respectively, an output current Io1 of the DC/DC converter 41a, an output current Io2 of the DC/DC converter 41b, and an output current Io of the DC/DC converter 41 are shown.

As shown in the figure, the carrier signals of the DC/DC converters 41a and 41b are triangular wave signals, and the Gl1 and Gl2 signals, and Gh1, and Gh2 signals are formed based on comparisons between the carrier signals and the voltage raising ratio command value. Only the Gl1 and Gl2 signals are shown in the figure. To be more specific, when the carrier signals of the DC/DC converters 41a and 41b have values smaller than the voltage raising ratio command value, the Gl1 and Gl2 signals go High and the switches SL1 and SL2 switch to an on state, whereas when the carrier signals have values larger than the voltage raising ratio command value, the Gl1 and Gl2 signals go Low and the switches SL1 and SL2 switch to an off state.

The currents IL1 and IL2 increase when the Gl1 and Gl2 signals go High and the switches SL1 and SL2 switch to an on state, whereas the currents IL1 and IL2 decrease when the switches SL1 and SL2 switch to an off state. The voltage raising operation is controlled by continuously repeating this on/off operation of the switches SL1 and SL2.

When the period of each of the carrier signals is T and the on-duty of the Gl1 and Gl2 signals (i.e., the interval that the Gl1 and Gl2 signals are held high/T) is D, the width of the pulse-shaped output currents Io1 and Io2 of the DC/DC converters 41a and 41b can be given by (1−D)·T. Therefore, the current pulses Io1 and Io2 having a pulse width of (1−D)·T are alternately sent to the inverter 20 twice in total during each period.

In other words, as compared with the one-phase DC/DC converter 40 according to embodiment 1 shown in FIG. 4, since the amplitude of the output current pulse of the two-phase DC/DC converter becomes about half of that of the one-phase DC/DC converter 40 and the number of the current pulses becomes twice that of the one-phase DC/DC converter 40, the current which flows into the DC link capacitor 30 can be reduced.

Next, an operation of minimizing the ripple current which flows into the DC link capacitor 30 will be explained.

Figure 17:
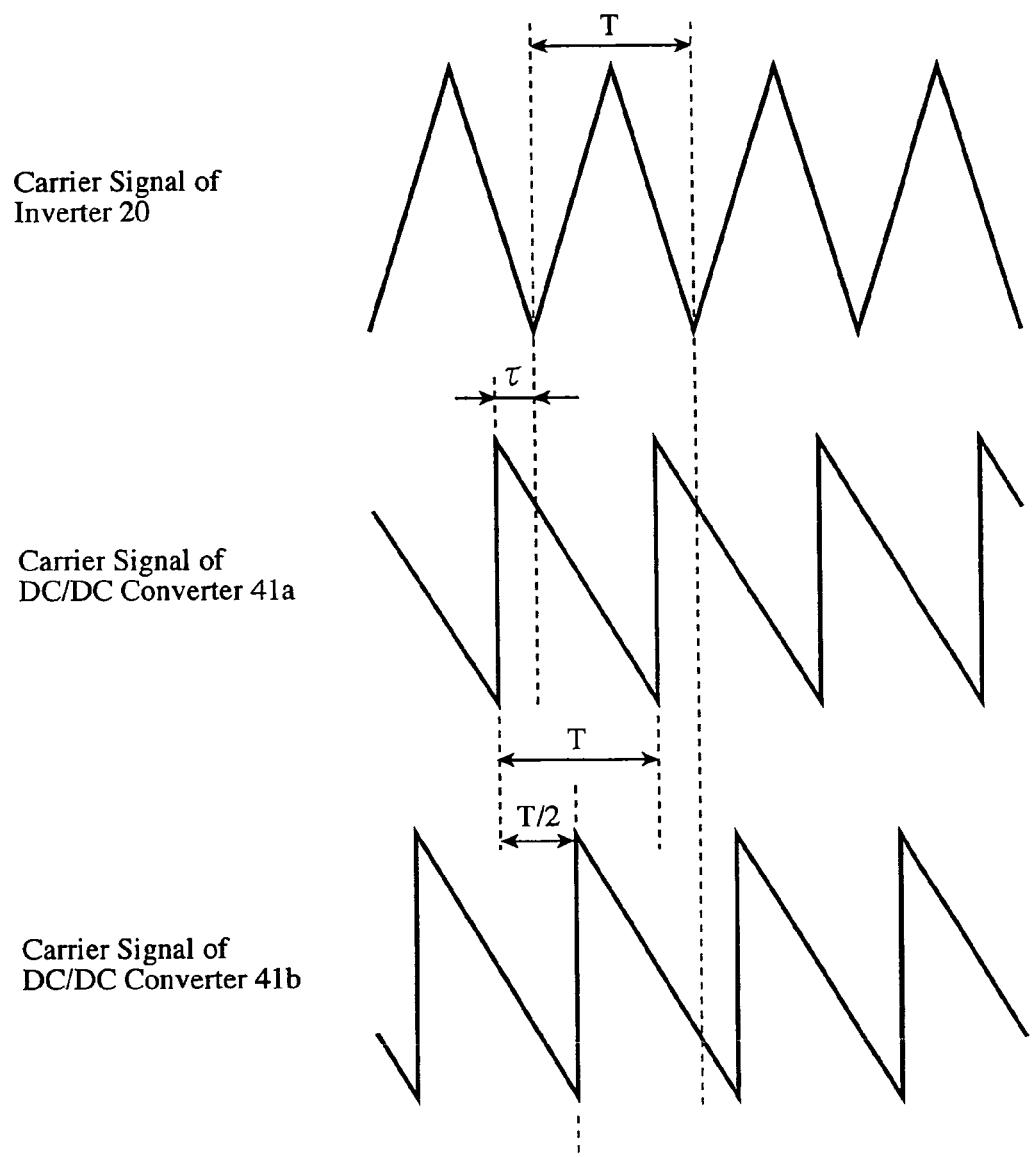
FIG. 17 is a diagram showing a relationship between a carrier signal of an inverter and a carrier signal of the DC/DC converter.

FIG. 17 is a diagram showing a relationship between the carrier signal of the inverter 20 and the carrier signals of the DC/DC converters 41a and 41b. As shown in the figure, the frequency of the carrier signal of the inverter 20 is made to match with those of the carrier signals of the DC/DC converters 41a and 41b. In addition, the phase difference between the carrier signal of the DC/DC converter 41a and the carrier signal of the DC/DC converter 41b is 180 degrees as mentioned above, and is expressed by T/2 when one period is T.

Next, requirements on the phase difference τ between the carrier signal of the inverter 20 and the carrier signal of the DC/DC converter 41a, which minimize the ripple current which flows into the DC link capacitor 30, will be explained.

Figure 18:
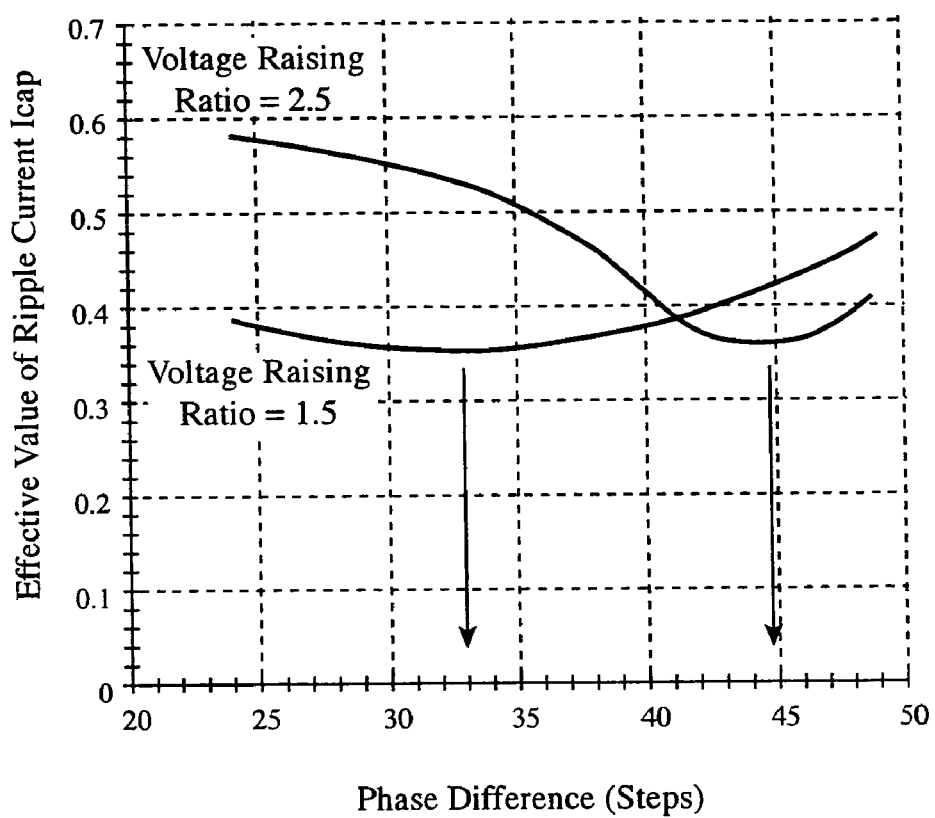
FIG. 18 is a diagram showing a relationship between a phase difference between the carrier signal of the inverter and the carrier signal of the DC/DC converter, and a ripple current which flows into a DC link capacitor.

FIG. 18 is a diagram showing a relationship between the phase difference τ and the ripple current Icap when the percentage of modulation is set to 1 and the power factor is set to 1 as the driving conditions of the inverter 20. The horizontal axis shows a value indicating the phase difference τ with the number of steps, and the vertical axis shows a relative value indicating the effective value of the ripple current Icap. In this figure, a relationship between the phase difference τ and the ripple current Icap in the case of the voltage raising ratio=1.5 and a relationship between the phase difference τ and the ripple current Icap in the case of the voltage raising ratio=2.5 are shown. In the case of the voltage raising ratio=2, since the on-duty D of the DC/DC converters 41a and 41b is 0.5 and the current Io becomes a DC current, no optimal phase difference exists. In other words, no matter what phase difference the carrier signal of the inverter and the carrier signal of the DC/DC converter have, there is no change in the ripple current.

As shown in FIG. 18, the ripple current Icap under a certain driving condition can be reduced to a minimum by setting the phase difference so that it meets optimal requirements, as in the case of embodiment 1. The optimal phase difference requirements can be defined according to the voltage raising ratio, as in the case of embodiment 1.

Figure 19:
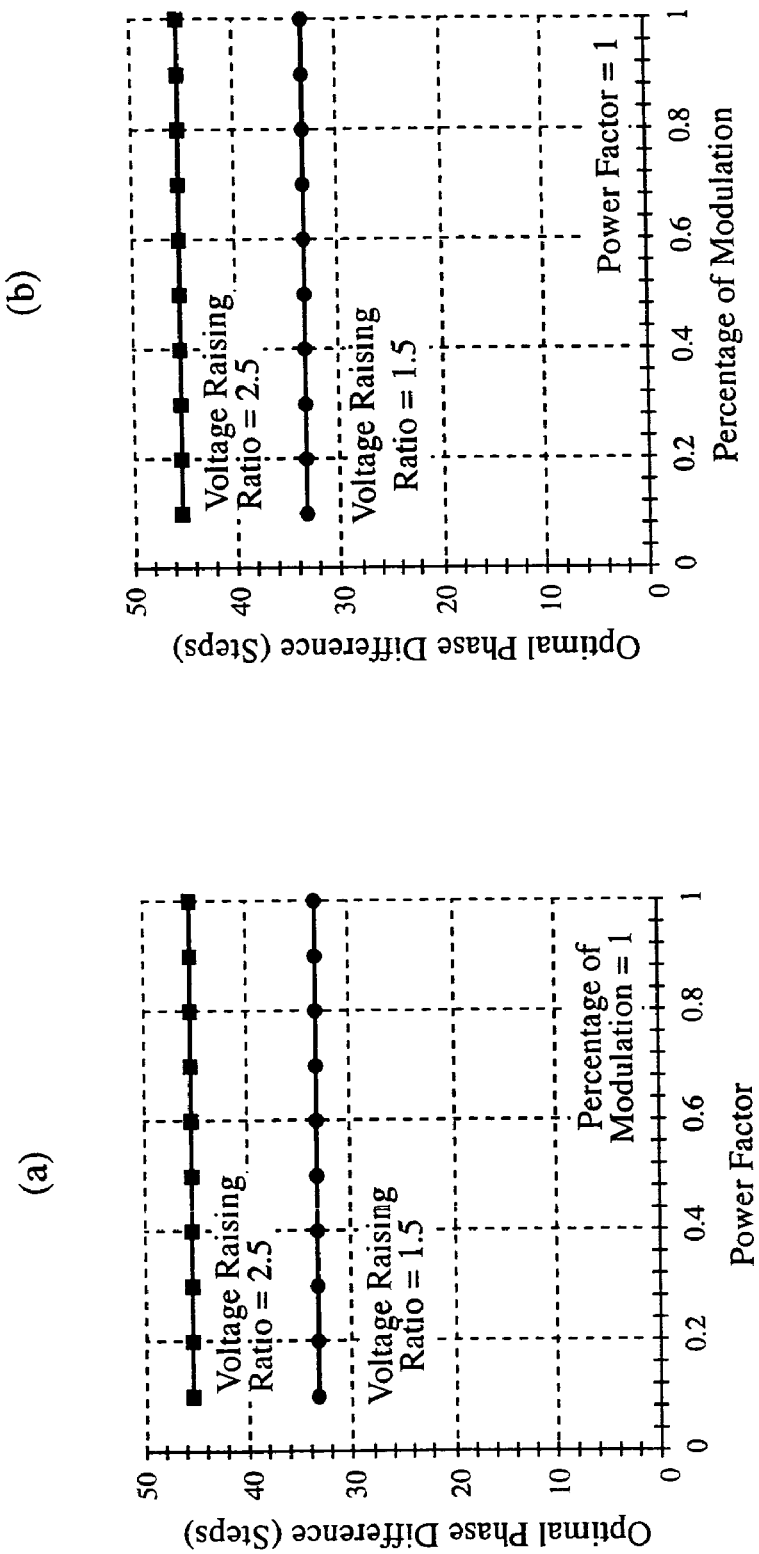
FIG. 19 is a diagram showing a relationship between a percentage of modulation and a power factor of the inverter, and an optimal phase difference.

FIG. 19(a) shows a relationship between the power factor and the optimal phase difference when the percentage of modulation is 1, and the FIG. 19(b) shows a relationship between the percentage of modulation and the optimal phase difference when the power factor is 1. It is clear from the figures that the optimal phase difference requirements do not change with changes in the percentage of modulation and the power factor. Although FIG. 19(a) shows only results in the case of the percentage of modulation=1, and FIG. 19(b) shows only results in the case of the power factor=1, similar results are obtained in the case of other percentages of modulation and other power factors.

Figure 20:
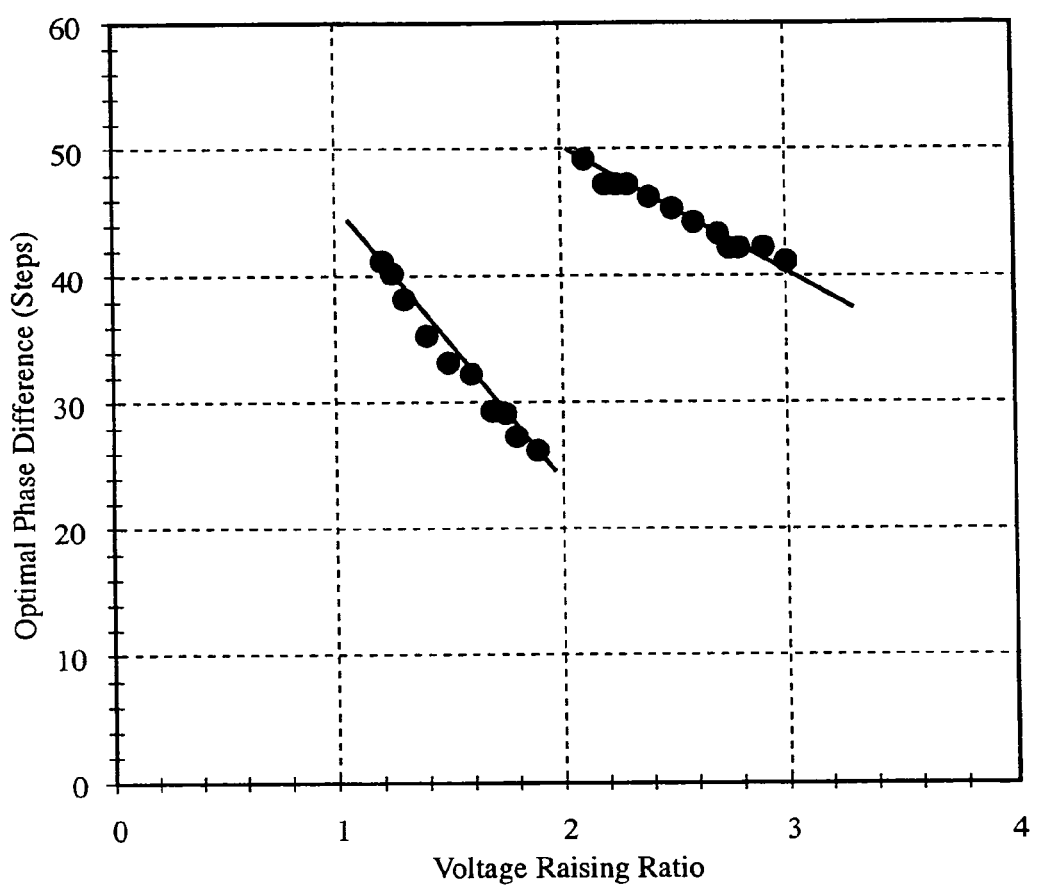
FIG. 20 is a diagram showing an optimal phase difference between a carrier signal of a DC/DC converter and a carrier signal of an inverter which depends on a voltage raising ratio, in a motor driving apparatus in accordance with embodiment 3.

FIG. 20 is a diagram showing a relationship between the voltage raising ratio and the optimal phase difference.

A process of changing the phase difference between the carrier signal of the inverter 20 and the carrier signal of the DC/DC converter 41 can be carried out, as in the case of embodiment 1.

As mentioned above, in accordance with embodiment 3, the frequency of the carrier signal of the DC/DC converter 41 is made to be equal to that of the carrier signal of the inverter 20, the phase difference between the carrier signal of the DC/DC converter 41a and that of the DC/DC converter 41b is set to 180 degrees (i.e., T/2), and the phase difference between the carrier signal of the inverter 20 and the carrier signal of the DC/DC converter 41 is set to an optimal value determined by the voltage raising ratio. Therefore, the present embodiment offers an advantage of being able to reduce the ripple current Icap which flows into the DC link capacitor 30, like embodiment 1.

Embodiment 4

A motor driving apparatus according to embodiment 4 has the same structure as that of embodiment 3, and the fundamental operation of a DC/DC converter according to embodiment 4 is the same as that of the DC/DC converter of embodiment 3.

In accordance with embodiment 4, the frequency of the carrier signal of the DC/DC converter 41 is set to be twice as high as that of the carrier signal of the inverter 20. In this case, the method of setting the phase difference between the carrier signal of the inverter 20 and the carrier signal of the DC/DC converter 41 to an optimal value which minimizes the ripple current Icap which flows into the DC link capacitor 30 differs from that of embodiment 3.

Since the drive frequency of the DC/DC converter 41 is twice as high as that of embodiment 3, this embodiment 4 has the merit of reducing the inductances of the choke coils L1 and L2 of the DC/DC converter 41, and hence downsizing the choke coils L1 and L2.

Figure 21:
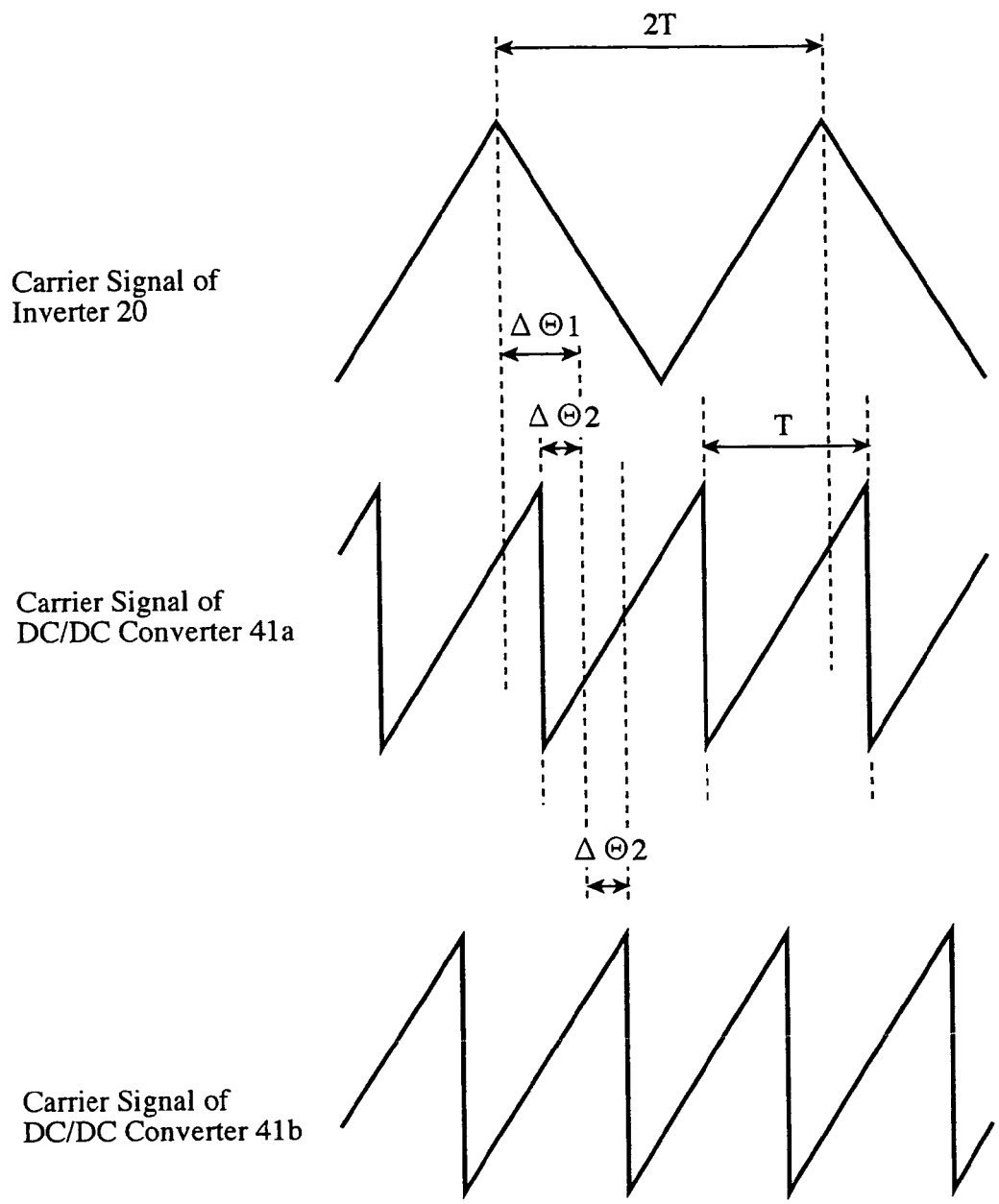
FIG. 21 is a diagram showing a relationship between the carrier signal of the inverter and the carrier signal of the DC/DC converter.

FIG. 21 is a diagram showing a relationship between the carrier signal of the inverter 20 and the carrier signals of the DC/DC converters 41a and 41b in accordance with embodiment 4. As shown in the figure, the frequency of the carrier signals of the DC/DC converters 41a and 41b is twice as high as that of the carrier signal of the inverter 20. In the figure, Δθ1 shows a phase difference between the average of the carrier signals of the DC/DC converters 41a and 41b, and the carrier signal of the inverter 20, and Δθ2 shows a phase difference between the above-mentioned average and the carrier signals of the DC/DC converters 41a and 41b. In accordance with embodiment 4, the phase differences Δθ1 and Δθ2 are used as parameters instead of the phase difference τ.

Figure 22:
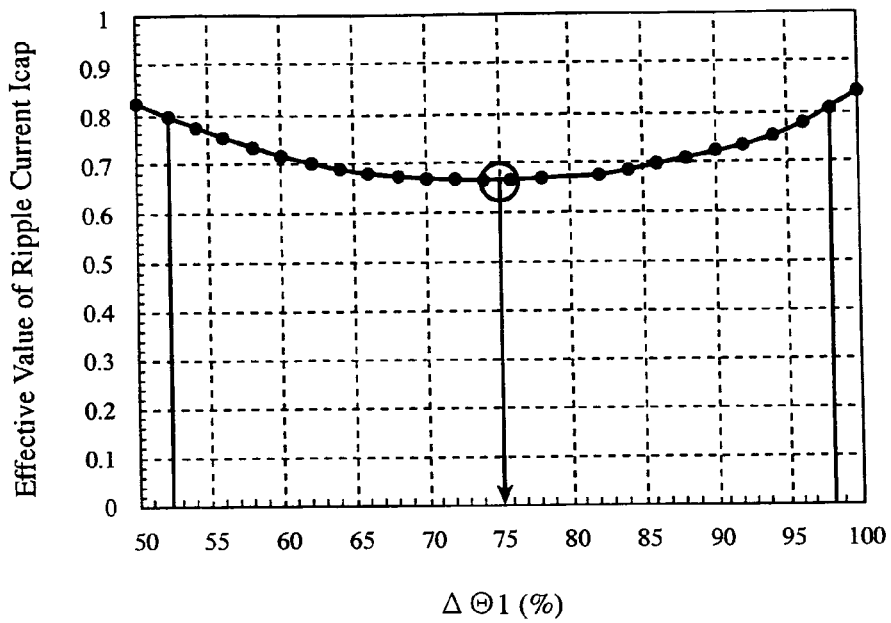
FIG. 22 is a diagram showing a relationship between $\Delta\theta 1$ and a ripple current which flows into a DC link capacitor.

Next, a method of calculating an optimal value of each of the phase differences Δθ1 and Δθ2 will be explained. FIG. 22 is a diagram showing a relationship between Δθ1 and the ripple current Icap which flows into the DC link capacitor 30. In this case, Δθ2=0, the driving conditions of the inverter 20 are defined as the percentage of modulation=1 and the power factor=1, and the voltage raising ratio of the DC/DC converter 41 is set to 2. The horizontal axis shows the phase difference Δθ1 expressed as a percentage, and the vertical axis shows a relative effective value of the ripple current Icap. As shown in the figure, there exists an optimal value of Δθ1 that minimizes the ripple current Icap. When Δθ2=0, since the DC/DC converters 41a and 41b are made to operate simultaneously, the driving conditions of the motor driving apparatus are the same as those of the motor driving apparatus of embodiment 1.

Figure 23:
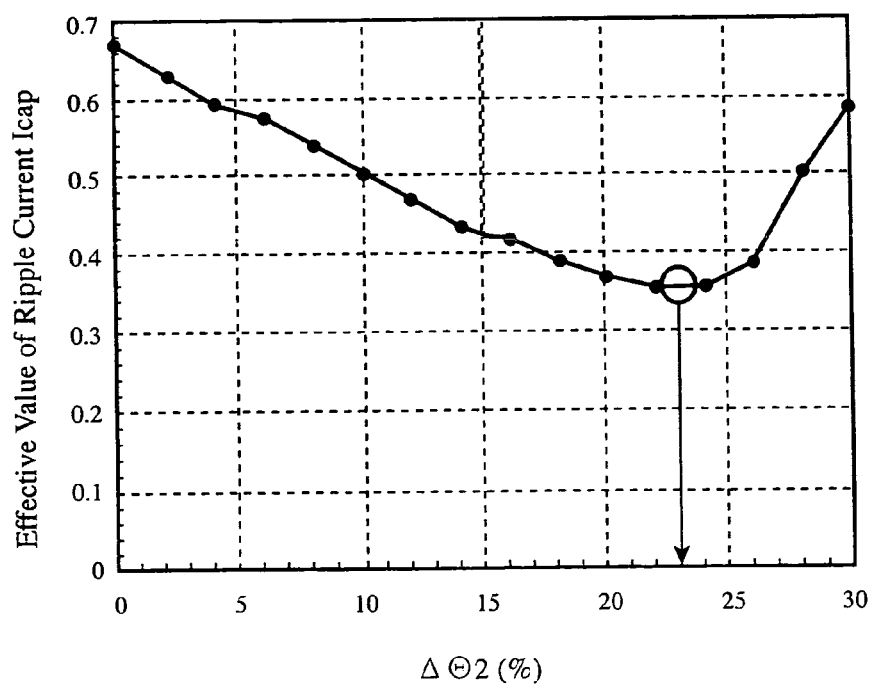
FIG. 23 is a diagram showing a relationship between $\Delta\theta 2$ and the ripple current which flows into the DC link capacitor.

FIG. 23 is a diagram showing a relationship between Δθ2 and the ripple current Icap which flows into the DC link capacitor 30 when the phase difference Δθ1 is fixed to its optimal value shown in FIG. 22. The driving conditions and requirements on the voltage raising ratio of the inverter 20 are the same as those shown in FIG. 22. The horizontal axis shows the phase difference Δθ2 expressed as a percentage, and the vertical axis shows a relative effective value of the ripple current Icap. As shown in the figure, there exists an optimal value of Δθ2 that minimizes the ripple current Icap.

Figure 24:
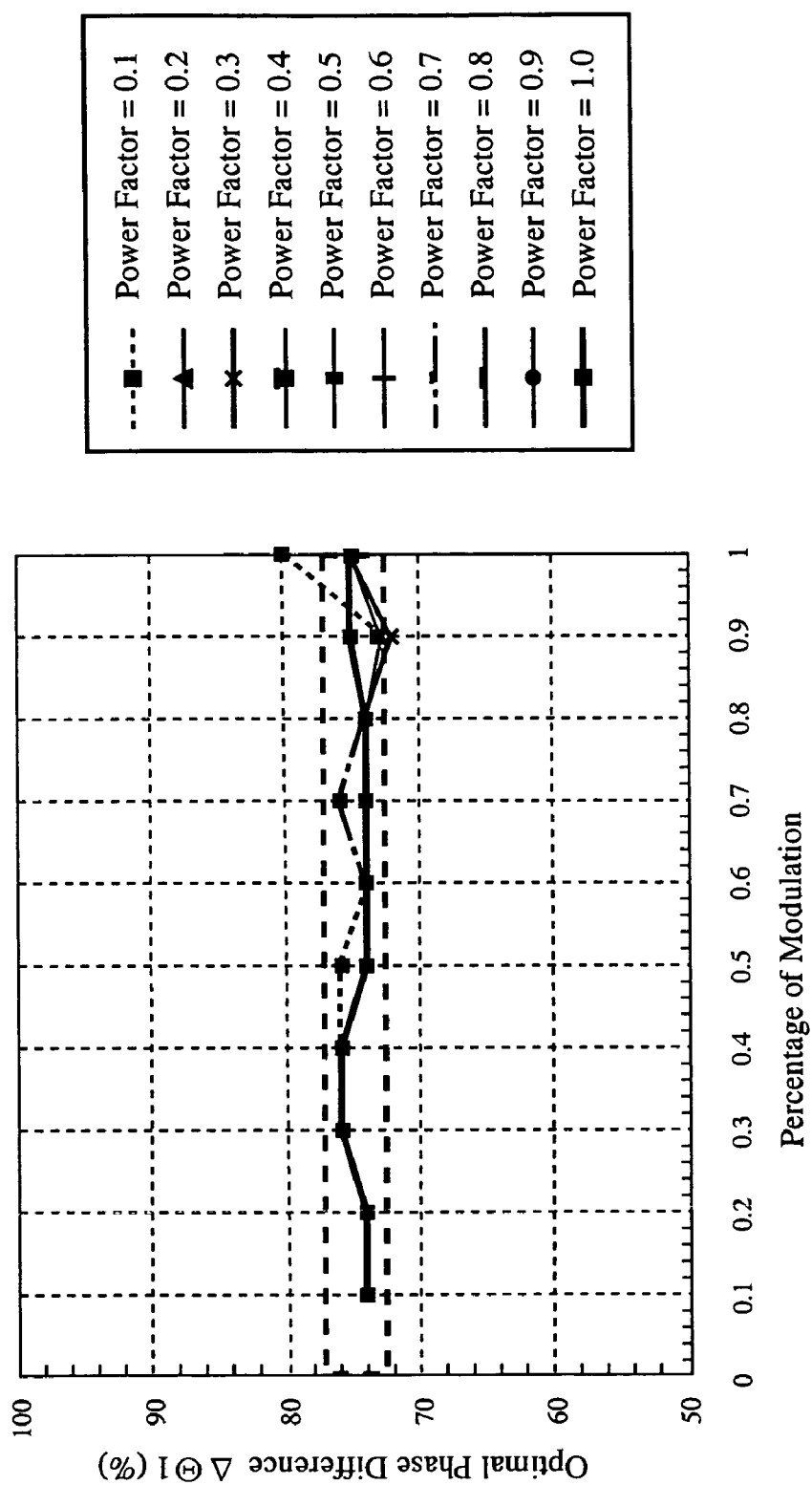
FIG. 24 is a diagram showing a relationship between a percentage of modulation at each power factor, and an optimum value of $\Delta\theta 1$.
Figure 25:
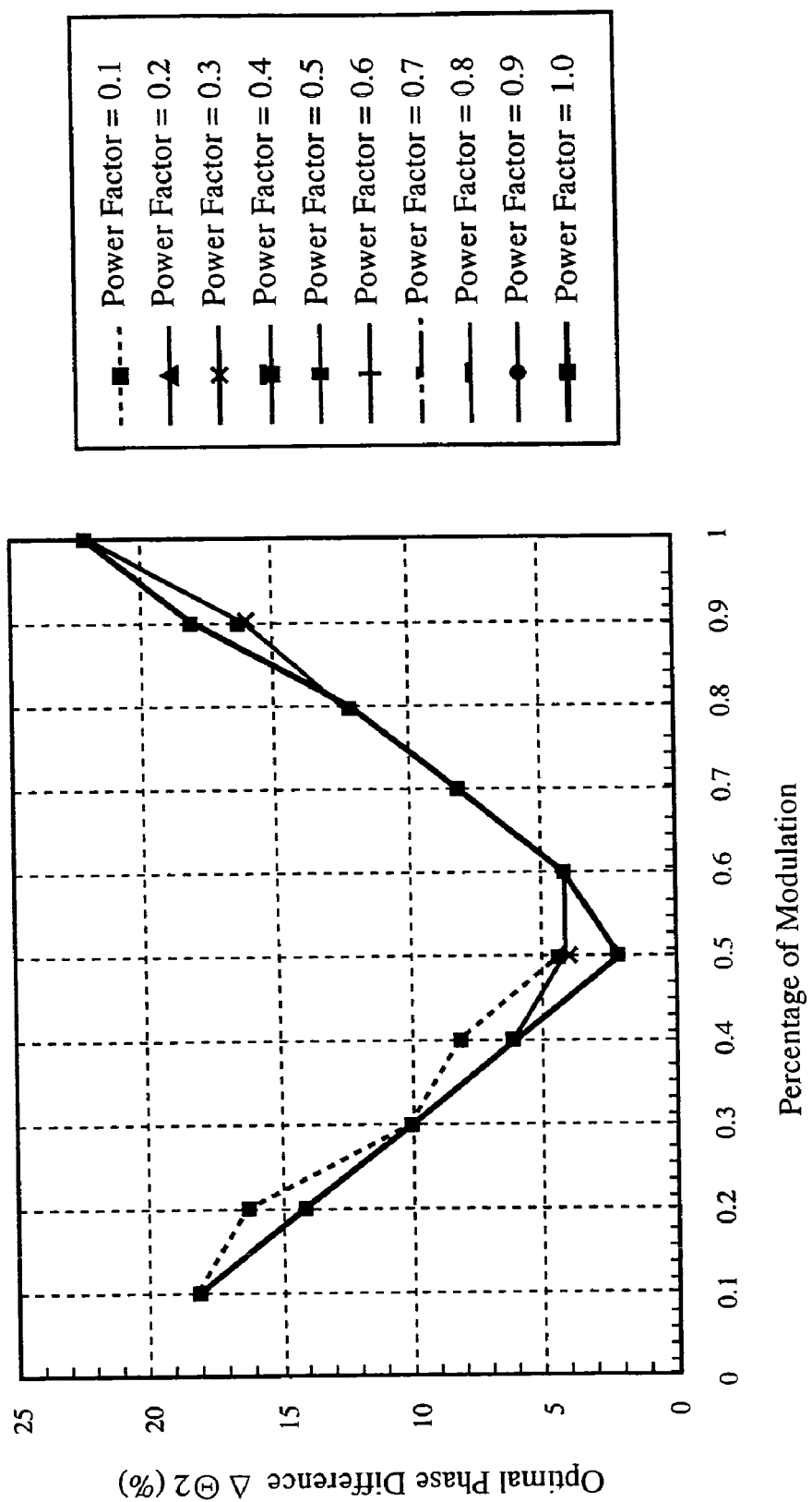
FIG. 25 is a diagram showing a relationship between the percentage of modulation at each power factor, and an optimum value of $\Delta\theta 2$.

FIG. 24 is a diagram showing a relationship between the percentage of modulation at each power factor and the optimum value of Δθ1 at the time when Δθ2 is fixed to 0. In this case, the voltage raising ratio is set to 2. As shown in the figure, the optimum value of Δθ1 is not influenced by the percentage of modulation and the power factor. FIG. 25 is a diagram showing a relationship between the percentage of modulation for each power factor and the optimum value of Δθ2 at the time when Δθ1 is set to its optimal phase difference. The voltage raising ratio is set to 2, as in the case of FIG. 24. As shown in the figure, the optimum value of Δθ2 does not depend on the power factor, but depends on the percentage of modulation.

Figure 26:
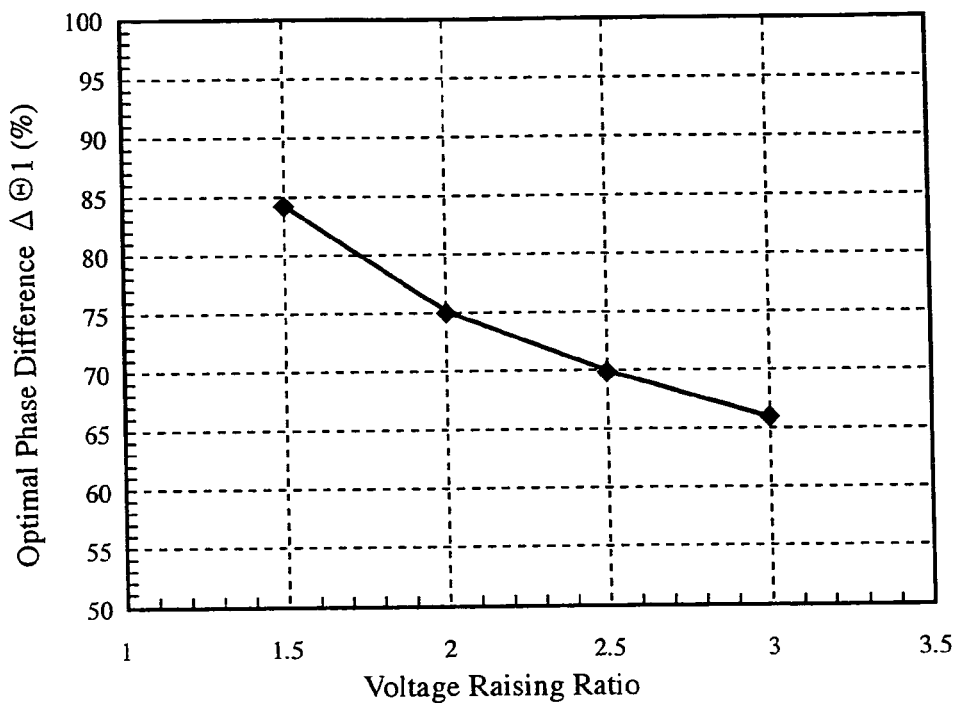
FIG. 26 is a diagram showing a relationship between a voltage raising ratio and an optimal difference value of $\Delta\theta 1$ in a motor driving apparatus in accordance with embodiment 4.
Figure 27:
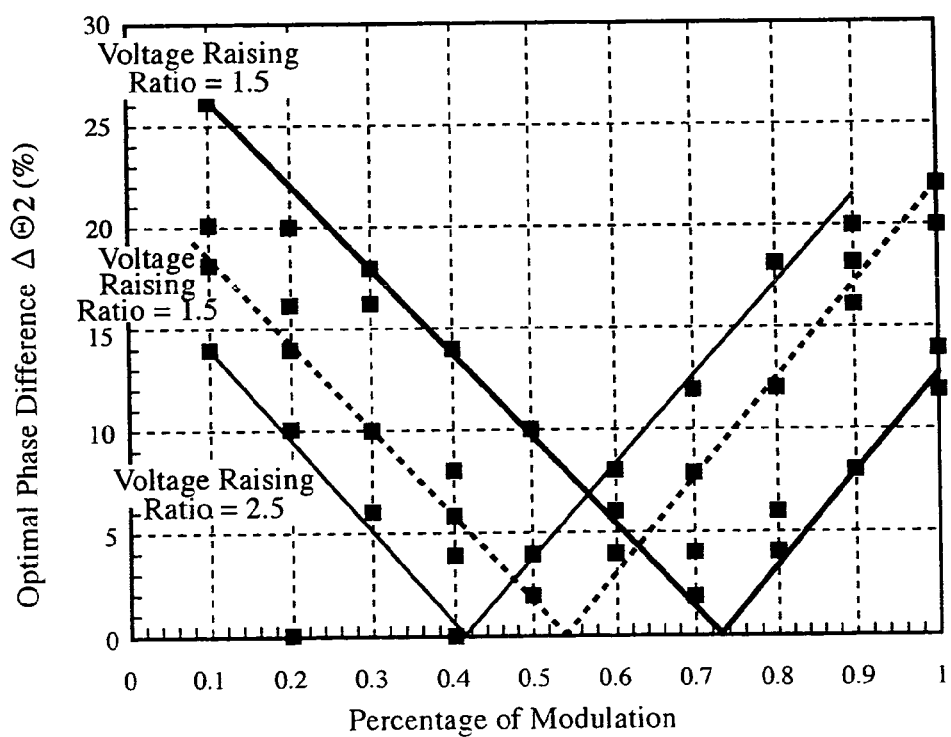
FIG. 27 is a diagram showing a relationship between a percentage of modulation and an optimal difference value of $\Delta\theta 2$ at a time of setting $\Delta\theta 1$ to the optimal difference value in the motor driving apparatus in accordance with embodiment 4.

A method of determining the optimal value of each of Δθ1 and Δθ2 in accordance with embodiment 4 will be explained. FIG. 26 is a diagram showing a relationship between the voltage raising ratio and the optimal value of Δθ1 and FIG. 27 is a diagram showing a relationship between the percentage of modulation and the optimal value of Δθ2 at the time when Δθ1 is set to its optimal value. In accordance with embodiment 4, the optimal value of Δθ1 according to the voltage raising ratio is determined based on FIG. 26 first. Then, the optimal value of Δθ2 according to the percentage of modulation for each voltage raising ratio is determined based on FIG. 27.

As mentioned above, in accordance with embodiment 4, the frequency of the carrier signal of the DC/DC converter 41 is set so as to be twice as high as that of the carrier signal of the inverter 20, the phase difference between the carrier signal of the inverter 20 and the carrier signal of the DC/DC converter 41 is set to an optimal value determined by the voltage raising ratio, while the phase difference between the carrier signals of the DC/DC converters 41a and 41b is set to an optimal value determined by the percentage of modulation of the inverter 20. As a result, the ripple current Icap which flows into the DC link capacitor 30 can be reduced, as in the case of embodiment 1.

The process of changing Δθ1 and Δθ2 can be carried out, as in the case of embodiment 1.

INDUSTRIAL APPLICABILITY

As mentioned above, the present invention is suitable for provision of a small-sized motor driving apparatus which can reduce the ripple current which flows into the DC link capacitor.

The invention claimed is:

1. A motor driving apparatus comprising:
a power supply source;
a DC/DC converter;
an inverter; and
a DC link capacitor, said DC link capacitor being connected between said inverter and said DC/DC converter and smoothing a voltage applied thereto,
wherein said motor driving apparatus makes a frequency of an inverter carrier signal for driving said inverter be synchronized with a frequency of a DC/DC converter carrier signal for driving said DC/DC converter, and controls a phase difference between both said carrier signals based on either an input voltage inputted to said DC/DC converter or an input voltage inputted to said inverter.

2. The motor driving apparatus according to claim 1, wherein the frequency of the DC/DC converter carrier signal is twice as high as that of the inverter carrier signal.

3. The motor driving apparatus according to claim 1, wherein the phase difference between both the carrier signals is also determined based on a percentage of modulation and a power factor which are operation parameters of the inverter.

4. The motor driving apparatus according to claim 1, wherein the DC/DC converter is provided with two DC/DC converters, and is driven in two phases, and the frequency of the DC/DC converter carrier signal is equal to that of the inverter carrier signal.

5. The motor driving apparatus according to claim 1, wherein the DC/DC converter is provided with two DC/DC converters, and is driven in two phases, the frequency of the DC/DC converter carrier signal is twice as high as that of the inverter carrier signal, and a phase difference between carrier signals of said two DC/DC converters is determined based on a percentage of modulation which is an operation parameter of the inverter.

6. A power converting apparatus comprising:
a power supply source;
a DC/DC converter configured to be driven by a DC/DC converter carrier signal;
an inverter configured to be driven by an inverter carrier signal;
a DC link capacitor connected between said inverter and said DC/DC converter and configured to smooth an applied voltage; and
a controller configured to synchronize a frequency of the inverter carrier signal with a frequency of the DC/DC converter carrier signal, and control a phase difference between said inverter carrier signal and said DC/DC converter carrier signal based on an input voltage inputted to said DC/DC converter.

7. The power converting apparatus according to claim 6, wherein the frequency of the DC/DC converter carrier signal is twice as high as that of the inverter carrier signal.

8. The power converting apparatus according to claim 6, wherein the phase difference between both the carrier signals is also determined based on a percentage of modulation and a power factor which are operation parameters of the inverter.

9. The power converting apparatus according to claim 6, wherein the DC/DC converter is provided with two DC/DC converters, and is driven in two phases, and the frequency of the DC/DC converter carrier signal is equal to that of the inverter carrier signal.

10. The power converting apparatus according to claim 6, wherein the DC/DC converter is provided with two DC/DC converters, and is driven in two phases, the frequency of the DC/DC converter carrier signal is twice as high as that of the inverter carrier signal, and a phase difference between carrier signals of said two DC/DC converters is determined based on a percentage of modulation which is an operation parameter of the inverter.

11. A power converting apparatus comprising:
a power supply source;
a DC/DC converter configured to be driven by a DC/DC converter carrier signal;
an inverter configured to be driven by an inverter carrier signal;
a DC link capacitor connected between said inverter and said DC/DC converter and configured to smooth an applied voltage; and
a controller configured to synchronize a frequency of the inverter carrier signal with a frequency of the DC/DC converter carrier signal, and control a phase difference between said inverter carrier signal and said DC/DC converter carrier signal based on an input voltage inputted to said inverter.

12. The power converting apparatus according to claim 11, wherein the frequency of the DC/DC converter carrier signal is twice as high as that of the inverter carrier signal.

13. The power converting apparatus according to claim 11, wherein the phase difference between both the carrier signals is also determined based on a percentage of modulation and a power factor which are operation parameters of the inverter.

14. The power converting apparatus according to claim 11, wherein the DC/DC converter is provided with two DC/DC converters, and is driven in two phases, and the frequency of the DC/DC converter carrier signal is equal to that of the inverter carrier signal.

15. The power converting apparatus according to claim 11, wherein the DC/DC converter is provided with two DC/DC converters, and is driven in two phases, the frequency of the DC/DC converter carrier signal is twice as high as that of the inverter carrier signal, and a phase difference between carrier signals of said two DC/DC converters is determined based on a percentage of modulation which is an operation parameter of the inverter.

16. A power converting apparatus comprising:
a power supply source;
a DC/DC converter configured to be driven by a DC/DC converter carrier signal;
an inverter configured to be driven by an inverter carrier signal;
a DC link capacitor connected between said inverter and said DC/DC converter and configured to smooth an applied voltage; and
a controller configured to synchronize a frequency of the inverter carrier signal with a frequency of the DC/DC converter carrier signal, and control a phase difference between said inverter carrier signal and said DC/DC converter carrier signal based on a ratio of an input voltage inputted to said DC/DC converter and an input voltage inputted to said inverter.

17. The power converting apparatus according to claim 16,
wherein the frequency of the DC/DC converter carrier signal is twice as high as that of the inverter carrier signal.

18. The power converting apparatus according to claim 16,
wherein the phase difference between both the carrier signals is also determined based on a percentage of modulation and a power factor which are operation parameters of the inverter.

19. The power converting apparatus according to claim 16,
wherein the DC/DC converter is provided with two DC/DC converters, and is driven in two phases, and the frequency of the DC/DC converter carrier signal is equal to that of the inverter carrier signal.

20. The power converting apparatus according to claim 16,
wherein the DC/DC converter is provided with two DC/DC converters, and is driven in two phases, the frequency of the DC/DC converter carrier signal is twice as high as that of the inverter carrier signal, and a phase difference between carrier signals of said two DC/DC converters is determined based on a percentage of modulation which is an operation parameter of the inverter.

21. A motor driving apparatus comprising:
a motor; and
a power converting apparatus connected to the motor, the power converting apparatus comprising
a power supply source,
a DC/DC converter configured to be driven by a DC/DC converter carrier signal,
an inverter configured to be driven by an inverter carrier signal,
a DC link capacitor connected between said inverter and said DC/DC converter and configured to smooth an applied voltage, and
a controller configured to synchronize a frequency of the inverter carrier signal with a frequency of the DC/DC converter carrier signal, and control a phase difference between said inverter carrier signal and said DC/DC converter carrier signal based on an input voltage inputted to said DC/DC converter.

22. A motor driving apparatus comprising:
a motor; and
a power converting apparatus connected to the motor, the power converting apparatus comprising
a power supply source,
a DC/DC converter configured to be driven by a DC/DC converter carrier signal,
an inverter configured to be driven by an inverter carrier signal,
a DC link capacitor connected between said inverter and said DC/DC converter and configured to smooth an applied voltage, and
a controller configured to synchronize a frequency of the inverter carrier signal with a frequency of the DC/DC converter carrier signal, and control a phase difference between said inverter carrier signal and said DC/DC converter carrier signal based on an input voltage inputted to said inverter.

23. A motor driving apparatus comprising:
a motor; and
a power converting apparatus connected to the motor, the power converting apparatus comprising
a power supply source,
a DC/DC converter configured to be driven by a DC/DC converter carrier signal,
an inverter configured to be driven by an inverter carrier signal,
a DC link capacitor connected between said inverter and said DC/DC converter and configured to smooth an applied voltage, and
a controller configured to synchronize a frequency of the inverter carrier signal with a frequency of the DC/DC converter carrier signal, and control a phase difference between said inverter carrier signal and said DC/DC converter carrier signal based on a ratio of an input voltage inputted to said DC/DC converter and an input voltage inputted to said inverter.

* * * * *

UNITED STATES PATENT AND TRADEMARK OFFICE
CERTIFICATE OF CORRECTION

PATENT NO. : 7,348,739 B2 Page 1 of 1
APPLICATION NO. : 10/584953
DATED : March 25, 2008
INVENTOR(S) : Takahiro Urakabe et al.

It is certified that error appears in the above-identified patent and that said Letters Patent is hereby corrected as shown below:

On the Title Page, title, item (54), and col. 1, lines 1-2, change "MOTOR DRIVING APPARATUS" to --MOTOR DRIVING APPARATUS AND POWER CONVERTING APPARATUS--.

Signed and Sealed this

Ninth Day of September, 2008

JON W. DUDAS
*Director of the United States Patent and Trademark Office*